(12) United States Patent　　(10) Patent No.:　US 12,634,719 B2

Sogabe et al.　　(45) Date of Patent:　May 19, 2026

(54) COMMUNICATION APPARATUS, BASE STATION, AND COMMUNICATION METHOD

(71) Applicants:DENSO CORPORATION, Kariya-city (JP); TOYOTA JIDOSHA KABUSHIKI KAISHA, Toyota (JP)

(72) Inventors: Haruhiko Sogabe, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 339 days.

(21) Appl. No.: 18/403,283

(22) Filed: Jan. 3, 2024

(65) Prior Publication Data

US 2024/0137782 A1　　Apr. 25, 2024
US 2024/0236711 A9　　Jul. 11, 2024

Related U.S. Application Data

(63) Continuation of application No. PCT/JP2022/027137, filed on Jul. 8, 2022.

(30) Foreign Application Priority Data

Jul. 9, 2021　(JP) ................................. 2021-114620

(51) Int. Cl.
*H04W 24/02*　　(2009.01)
*H04W 24/10*　　(2009.01)
*H04W 76/20*　　(2018.01)

(52) U.S. Cl.
CPC ........... *H04W 24/02* (2013.01); *H04W 24/10* (2013.01); *H04W 76/20* (2018.02)

(58) Field of Classification Search
CPC ...... H04W 24/02; H04W 24/10; H04W 76/20
See application file for complete search history.

(56) References Cited

U.S. PATENT DOCUMENTS

2023/0107424 A1　　4/2023　Min et al.
2024/0430725 A1*　12/2024　Koskela ................ H04W 76/27

FOREIGN PATENT DOCUMENTS

JP　　2019121828　A　　7/2019
WO　　2021070388　A1　　4/2021

OTHER PUBLICATIONS

"RRM relaxation criteria in RRC_Connected," Samsung, 3GPP TSG-RAN WG2 Meeting #114-e, R2-2106404, dated May 19-27, 2021.
3GPP TR 38.875 V17.0.0, 3rd Generation Partnership Project; Technical Specification Group Radio Access Network; Study on support of reduced capability NR devices (Release 17), dated Mar. 2021.

(Continued)

*Primary Examiner* — Myron Wyche
(74) *Attorney, Agent, or Firm* — Harness, Dickey & Pierce, P.L.C.

(57)　　ABSTRACT

A communication apparatus comprises: a communicator configured to transmit a UE assistance information message including information indicating whether or not a stationarity criterion regarding measurement relaxation in a radio resource control (RRC) connected state is fulfilled to a base station.

11 Claims, 22 Drawing Sheets

(56)         References Cited

OTHER PUBLICATIONS

3GPP TS 38.133 (v17.1.0) (Mar. 2021), $3^{rd}$ Generation Partnership Project; Technical Specification Group Radio Access Network; NR; Requirements for support of radio resource management (Release 17), pp. 1-2172.

3GPP TS 38.304 (v16.5.0) (Jun. 2021), $3^{rd}$ Generation Partnership Project; Technical Specification Group Radio Access Network; NR; User Equipment (UE) procedures in Idle mode and RRC Inactive state (Release 16), pp. 1-39.

3GPP TS 38.331 (v16.5.0) (Jun. 2021), 3rd Generation Partnership Project; Technical Specification Group Radio Access Network; NR; Radio Resource Control (RRC) protocol specification (Release 16), pp. 1-959.

RP-201677, "Revised SID on Study on support of reduced capability NR devices", Ericsson, 3GPP TSG RAN Meeting #89e, Electronic Meeting, Sep. 14-18, 2020, pp. 1-4.

R2-2105418, "Summary of [Post113bis-e][102][RedCap] RRM relaxations", Qualcomm Incorporated, 3GPP TSG-RAN WG2 Meeting #114-3, Online, May 19-27, 2021, pp. 1-19.

R2-2106531, "Report of [AT114-e][111][RedCap] RRM relaxation criteria in idle/inactive", Samsung, 3GPP TSG-RAN WG2 Meeting #114e, Online, Apr. 12-20, 2021, pp. 1-18.

R2-2106472, "Report from Break-out session on R17 NTN and REDCAP", ZTE Corporation, 3GPP TSG-RAN WG2 Meeting #114 electronic, Online, May 19-27, 2021, pp. 1-39.

R2-2104060, "RRM measurement relaxation for RedCap UE", Huawei, HiSilicon, 3GPP TSG-RAN WG2 Meeting #113bis-e, Electronic, Apr. 12-20, 2021, pp. 1-6.

* cited by examiner

*ReportConfigNR* information element

```
ReportConfigNR ::=
    reportType
    ...
    relaxedMeasEventTriggered       RelaxedMeasEventTriggerConfig-r17

RelaxedMeasEventTriggerConfig-r17 ::=  SEQUENCE {
    eventId-r17                  CHOICE {
    eventS1-r17                  SEQUENCE {
        SEQUENCE {
        s-SearchDeltaP-Stationary-r17   ENUMERATED {dB3, dB4, dB9, dB12, dB15, spare3,
spare2, spare1},
        s-SearchDeltaQ-Stationary-r17   ENUMERATED {dB3, dB6, dB9, dB13, dB15, spare3,
spare2, spare1}    OPTIONAL,   -- Need S
        t-SearchDeltaP-Stationary-r17   ENUMERATED { s5, s10, s20, s30, s60, s120, s180,
s240, s300, spare7, spare6, spare5, spare4, spare3, spare2, spare1},
        reportOnLeave-r17            BOOLEAN
        },
    eventS2-r17                  SEQUENCE {
        s-SearchDeltaP-Stationary-r17   ENUMERATED {dB3, dB6, dB9, dB12, dB15, spare3,
spare2, spare1},
        s-SearchDeltaQ-Stationary-r17   ENUMERATED {dB3, dB6, dB9, dB12, dB15, spare3,
spare2, spare1}    OPTIONAL,   -- Need S
        t-SearchDeltaP-Stationary-r17   ENUMERATED {s5, s10, s20, s30, s60, s120, s180, s240, s300,
spare7, spare6, spare5, spare4, spare3, spare2, spare1},
        s-SearchThreshold-r17        ReselectionThreshold,
        s-SearchThresholdQ-r17       ReselectionThresholdQ,    OPTIONAL,    -- Need R
        reportOnLeave-r17            BOOLEAN
        },
    ...
    reportInterval-r17           ReportInterval,
    reportAmount-r17             ENUMERATED {r1,r2,r4,r8,r16,r32,r64, infinity},
    ...
} -- ASN1STOP
```

FIG. 7

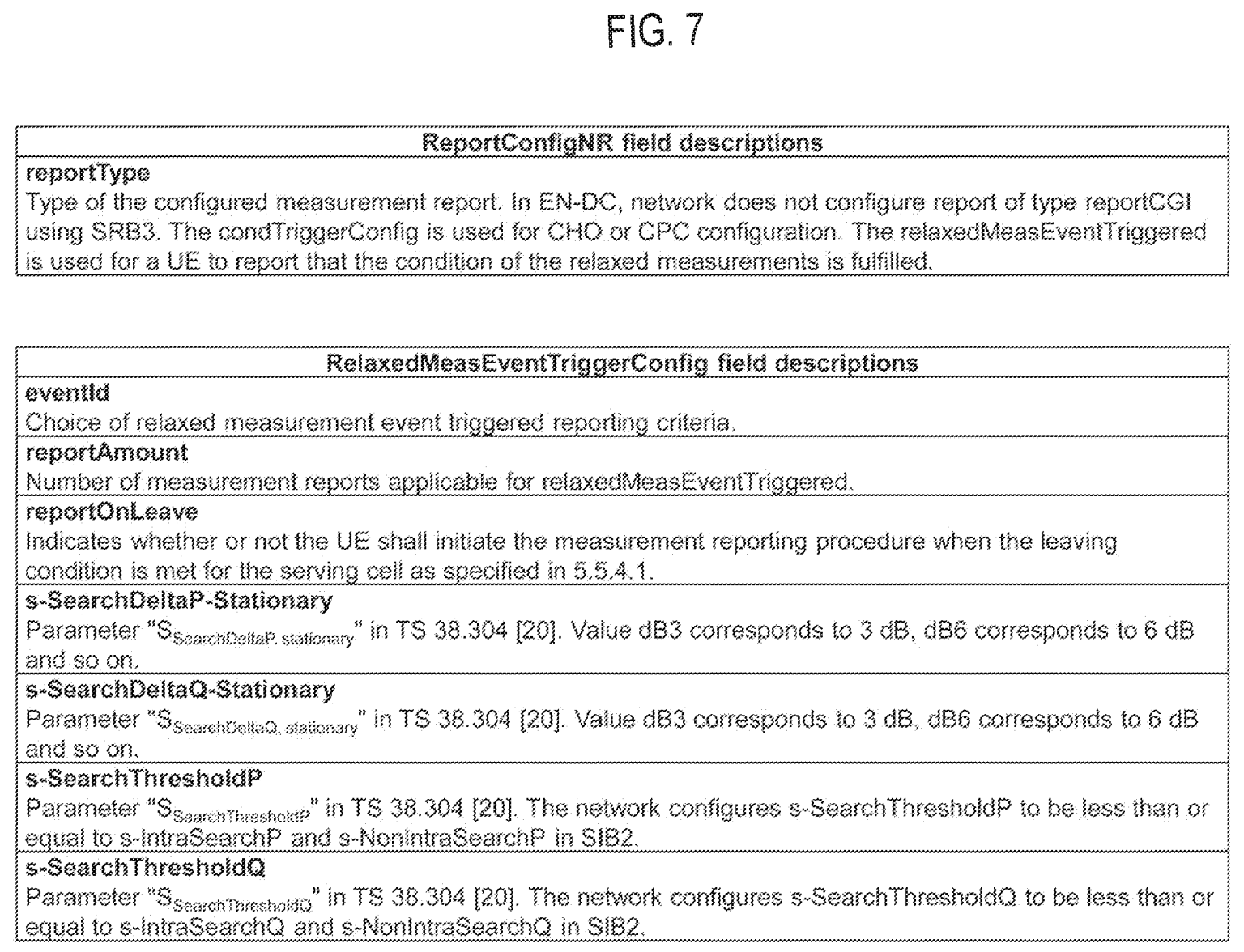

ReportConfigNR field descriptions reportType
Type of the configured measurement report. In EN-DC, network does not configure report of type reportCGI using SRB3. The condTriggerConfig is used for CHO or CPC configuration. The relaxedMeasEventTriggered is used for a UE to report that the condition of the relaxed measurements is fulfilled.

RelaxedMeasEventTriggerConfig field descriptions eventId
Choice of relaxed measurement event triggered reporting criteria.

reportAmount
Number of measurement reports applicable for relaxedMeasEventTriggered.

reportOnLeave
Indicates whether or not the UE shall initiate the measurement reporting procedure when the leaving condition is met for the serving cell as specified in 5.5.4.1.

s-SearchDeltaP-Stationary
Parameter "$S_{SearchDeltaP, \, stationary}$" in TS 38.304 [20]. Value dB3 corresponds to 3 dB, dB6 corresponds to 6 dB and so on.

s-SearchDeltaQ-Stationary
Parameter "$S_{SearchDeltaQ, \, stationary}$" in TS 38.304 [20]. Value dB3 corresponds to 3 dB, dB6 corresponds to 6 dB and so on.

s-SearchThresholdP
Parameter "$S_{SearchThresholdP}$" in TS 38.304 [20]. The network configures s-SearchThresholdP to be less than or equal to s-IntraSearchP and s-NonIntraSearchP in SIB2.

s-SearchThresholdQ
Parameter "$S_{SearchThresholdQ}$" in TS 38.304 [20]. The network configures s-SearchThresholdQ to be less than or equal to s-IntraSearchQ and s-NonIntraSearchQ in SIB2.

FIG. 8

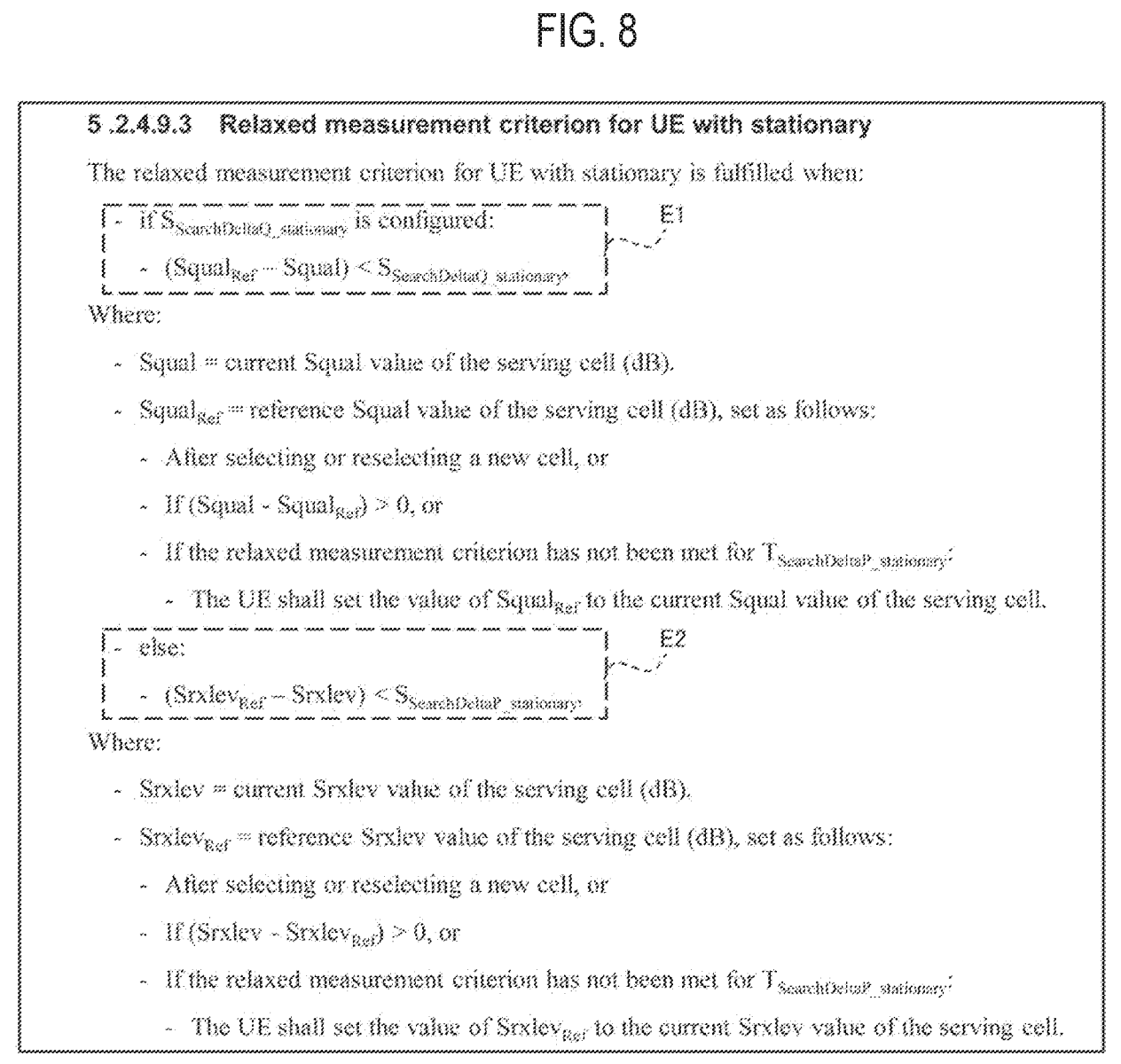

5.2.4.9.3 Relaxed measurement criterion for UE with stationary

The relaxed measurement criterion for UE with stationary is fulfilled when:

- If $S_{SearchDeltaQ\_stationary}$ is configured: — E1

$- (Squal_{Ref} - Squal) < S_{SearchDeltaQ\_stationary}$

Where:

- $Squal$ = current Squal value of the serving cell (dB).

- $Squal_{Ref}$ = reference Squal value of the serving cell (dB), set as follows:

- After selecting or reselecting a new cell, or

- If $(Squal - Squal_{Ref}) > 0$, or

- If the relaxed measurement criterion has not been met for $T_{SearchDeltaP\_stationary}$:

- The UE shall set the value of $Squal_{Ref}$ to the current Squal value of the serving cell.

- else: — E2

$- (Srxlev_{Ref} - Srxlev) < S_{SearchDeltaP\_stationary}$

Where:

- $Srxlev$ = current Srxlev value of the serving cell (dB).

- $Srxlev_{Ref}$ = reference Srxlev value of the serving cell (dB), set as follows:

- After selecting or reselecting a new cell, or

- If $(Srxlev - Srxlev_{Ref}) > 0$, or

- If the relaxed measurement criterion has not been met for $T_{SearchDeltaP\_stationary}$:

- The UE shall set the value of $Srxlev_{Ref}$ to the current Srxlev value of the serving cell.

FIG. 9

5.2.4.9.3　Relaxed measurement criterion for UE with stationary

The relaxed measurement criterion for UE with stationary is fulfilled when:

- If $S_{SearchDeltaQ\_stationary}$ is configured:

- $(Squal_{Ref} - Srxlev) < S_{SearchDeltaP\_stationary}$ and $(Squal_{Ref} - Squal) < S_{SearchDeltaQ\_stationary}$;   E3

- else:

- $(Srxlev_{Ref} - Srxlev) < S_{SearchDeltaP\_stationary}$;  E4

Where:

- Squal = current Squal value of the serving cell (dB).

- $Squal_{Ref}$ = reference Squal value of the serving cell (dB), set as follows:

- After selecting or reselecting a new cell, or

- If $(Squal - Squal_{Ref}) > 0$, or

- If the relaxed measurement criterion has not been met for $T_{SearchDeltaP\_stationary}$:

- The UE shall set the value of $Squal_{Ref}$ to the current Squal value of the serving cell.

- Srxlev = current Srxlev value of the serving cell (dB).

- $Srxlev_{Ref}$ = reference Srxlev value of the serving cell (dB), set as follows:

- After selecting or reselecting a new cell, or

- If $(Srxlev - Srxlev_{Ref}) > 0$, or

- If the relaxed measurement criterion has not been met for $T_{SearchDeltaP\_stationary}$:

- The UE shall set the value of $Srxlev_{Ref}$ to the current Srxlev value of the serving cell.

FIG. 10

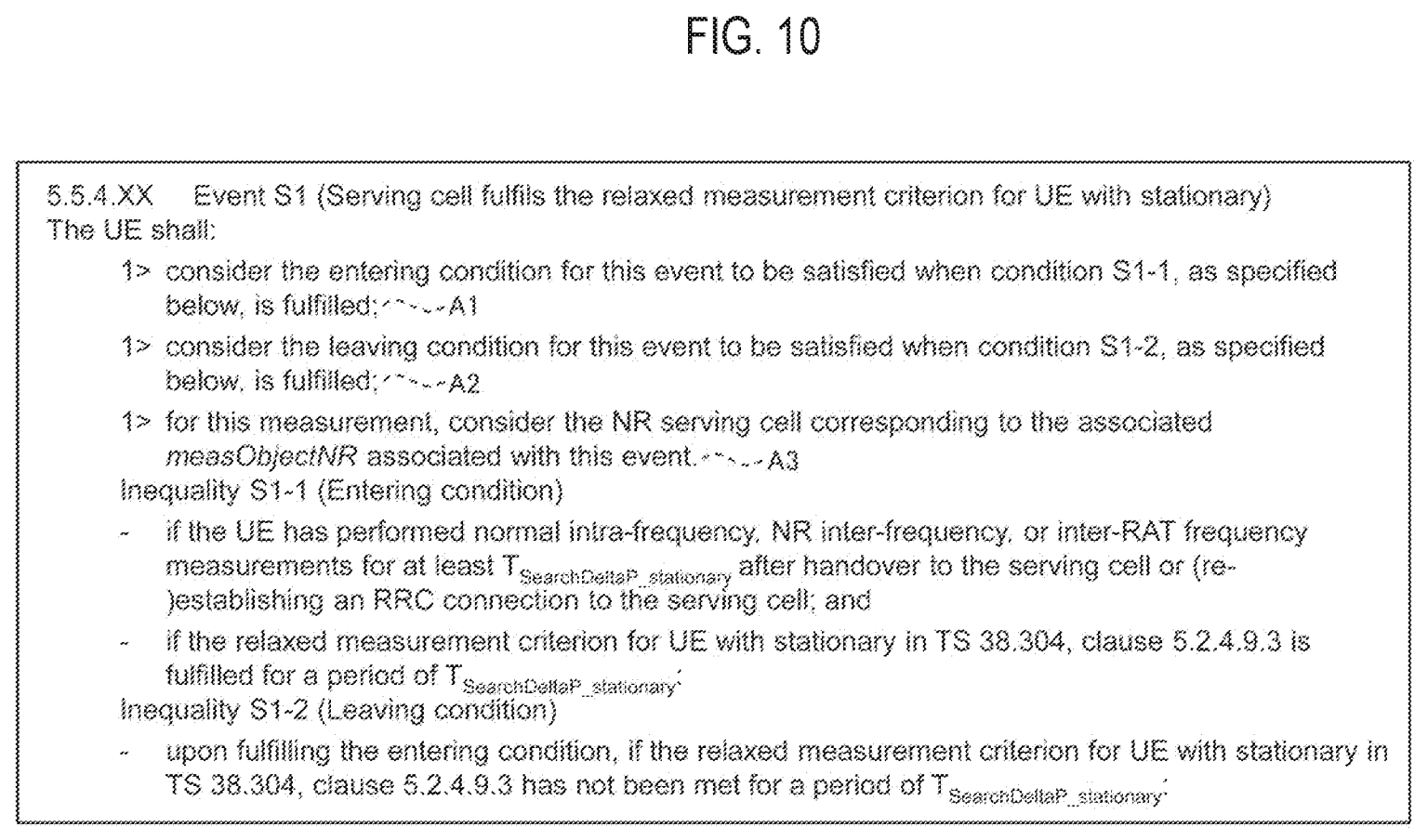

5.5.4.XX    Event S1 (Serving cell fulfils the relaxed measurement criterion for UE with stationary)

The UE shall:

1> consider the entering condition for this event to be satisfied when condition S1-1, as specified below, is fulfilled; ~~~A1

1> consider the leaving condition for this event to be satisfied when condition S1-2, as specified below, is fulfilled; ~~~A2

1> for this measurement, consider the NR serving cell corresponding to the associated *measObjectNR* associated with this event. ~~~A3

Inequality S1-1 (Entering condition)

~ if the UE has performed normal intra-frequency, NR inter-frequency, or inter-RAT frequency measurements for at least $T_{SearchDeltaP\_stationary}$ after handover to the serving cell or (re-)establishing an RRC connection to the serving cell; and ~ if the relaxed measurement criterion for UE with stationary in TS 38.304, clause 5.2.4.9.3 is fulfilled for a period of $T_{SearchDeltaP\_stationary}$ Inequality S1-2 (Leaving condition)

~ upon fulfilling the entering condition, if the relaxed measurement criterion for UE with stationary in TS 38.304, clause 5.2.4.9.3 has not been met for a period of $T_{SearchDeltaP\_stationary}$

FIG. 11

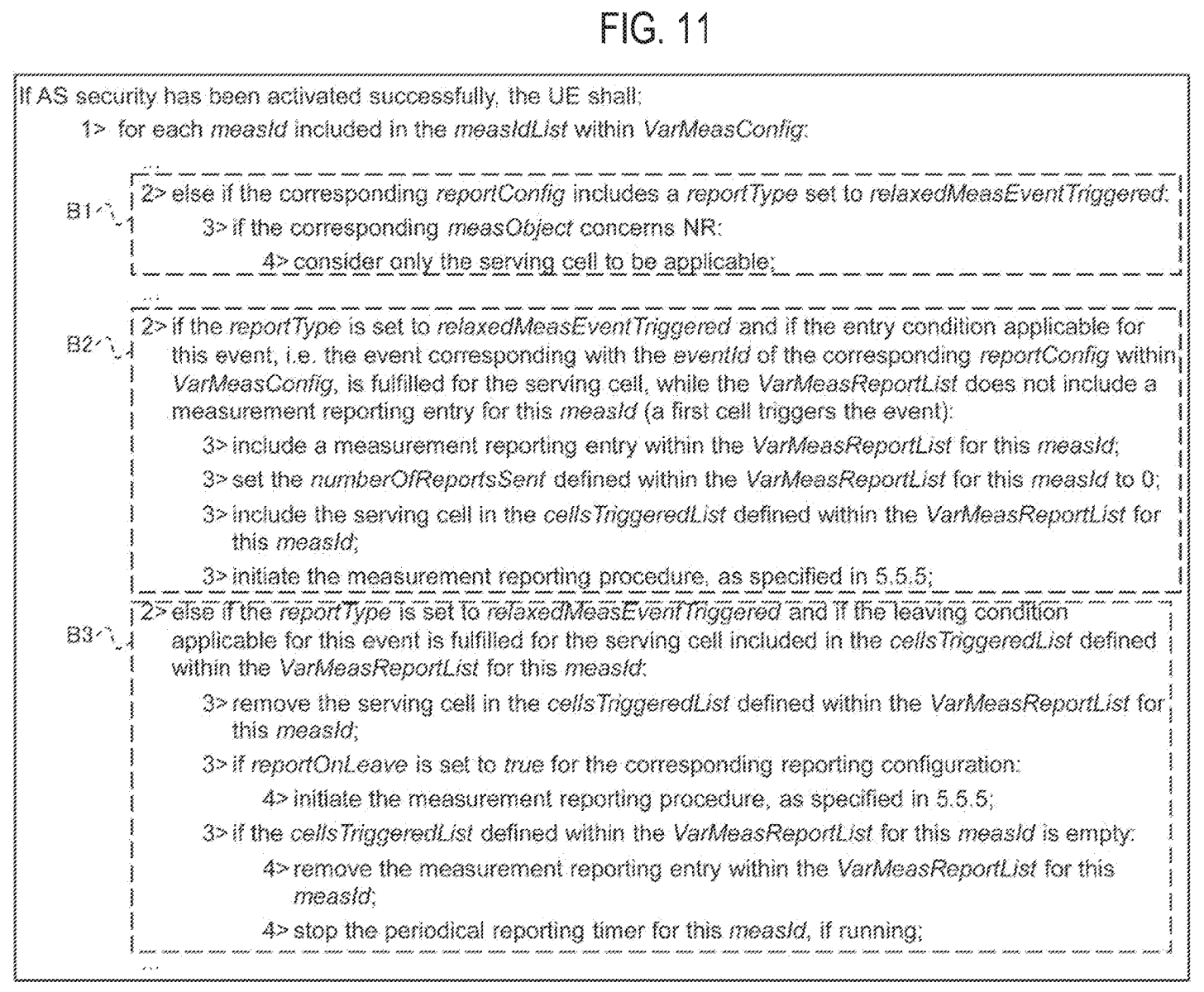

If AS security has been activated successfully, the UE shall:

1> for each *measId* included in the *measIdList* within *VarMeasConfig*:

B1—
2> else if the corresponding *reportConfig* includes a *reportType* set to *relaxedMeasEventTriggered*:

3> if the corresponding *measObject* concerns NR:

4> consider only the serving cell to be applicable:

B2—
2> if the *reportType* is set to *relaxedMeasEventTriggered* and if the entry condition applicable for this event, i.e. the event corresponding with the *eventId* of the corresponding *reportConfig* within *VarMeasConfig*, is fulfilled for the serving cell, while the *VarMeasReportList* does not include a measurement reporting entry for this *measId* (a first cell triggers the event):

3> include a measurement reporting entry within the *VarMeasReportList* for this *measId*;

3> set the *numberOfReportsSent* defined within the *VarMeasReportList* for this *measId* to 0;

3> include the serving cell in the *cellsTriggeredList* defined within the *VarMeasReportList* for this *measId*;

3> initiate the measurement reporting procedure, as specified in 5.5.5;

B3—
2> else if the *reportType* is set to *relaxedMeasEventTriggered* and if the leaving condition applicable for this event is fulfilled for the serving cell included in the *cellsTriggeredList* defined within the *VarMeasReportList* for this *measId*:

3> remove the serving cell in the *cellsTriggeredList* defined within the *VarMeasReportList* for this *measId*;

3> if *reportOnLeave* is set to *true* for the corresponding reporting configuration:

4> initiate the measurement reporting procedure, as specified in 5.5.5;

3> if the *cellsTriggeredList* defined within the *VarMeasReportList* for this *measId* is empty:

4> remove the measurement reporting entry within the *VarMeasReportList* for this *measId*;

4> stop the periodical reporting timer for this *measId*, if running;

FIG. 13

*OtherConfig* information element

```
-- ASN1START

OtherConfig-r17 ::=                    SEQUENCE {
    stationaryStatusConfig-r17             SetupRelease
{StationaryStatusConfig-r17}                OPTIONAL, -- Need M
    ...
}

StationaryStatusConfig-r17 ::= SEQUENCE {
    stationaryStatusProhibitTimer-r17  ENUMERATED {s0, s0dot5, s1, s2, s5, s10,
s20, s30,                                         s60, s90, s120, s300, s600,
spare3, spare2, spare1}
}
...
```

*OtherConfig* field descriptions stationaryStatusConfig
Configuration for the UE to report assistance information to inform the gNB about UE detected stationary status.

stationaryStatusProhibitTimer
Prohibit timer for stationary status information reporting. Value in seconds. Value s0 means prohibit timer is set to 0 seconds, value s0dot5 means prohibit timer is set to 0.5 seconds, value s1 means prohibit timer is set to 1 second and so on.

| Timer | Start | Stop | At expiry |
|---|---|---|---|
| Txxx | Upon transmitting UEAssistanceInformation message with stationaryStatus. | Upon releasing stationaryStatusConfig during the connection re-establishment/resume procedures, or upon receiving stationaryStatusConfig set to release. | No action. |

FIG. 14

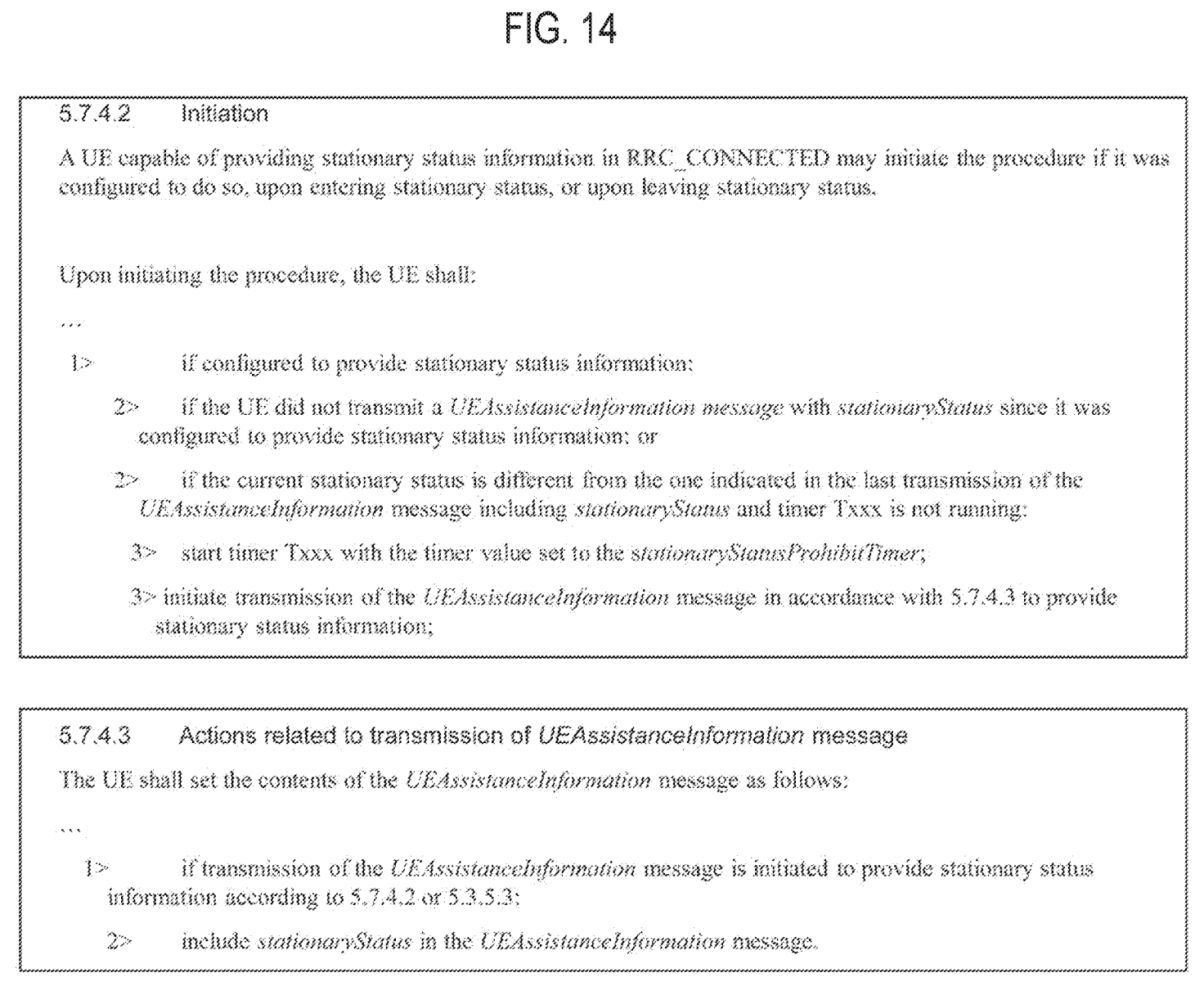

5.7.4.2    Initiation

A UE capable of providing stationary status information in RRC_CONNECTED may initiate the procedure if it was configured to do so, upon entering stationary status, or upon leaving stationary status.

Upon initiating the procedure, the UE shall:

1>    if configured to provide stationary status information:

2>    if the UE did not transmit a *UEAssistanceInformation* message with *stationaryStatus* since it was configured to provide stationary status information; or 2>    if the current stationary status is different from the one indicated in the last transmission of the *UEAssistanceInformation* message including *stationaryStatus* and timer Txxx is not running:

3>    start timer Txxx with the timer value set to the *stationaryStatusProhibitTimer*;

3>    initiate transmission of the *UEAssistanceInformation* message in accordance with 5.7.4.3 to provide stationary status information;

**5.7.4.3    Actions related to transmission of *UEAssistanceInformation* message**

The UE shall set the contents of the *UEAssistanceInformation* message as follows:

1>    if transmission of the *UEAssistanceInformation* message is initiated to provide stationary status information according to 5.7.4.2 or 5.3.5.3:

2>    include *stationaryStatus* in the *UEAssistanceInformation* message.

FIG. 15

UEAssistanceInformation message

```
-- ASN1START
-- TAG-UEASSISTANCEINFORMATION-START

UEAssistanceInformation-v17-IEs ::= SEQUENCE {
    stationaryStatus-r17         BOOLEAN
OPTIONAL,
    }
    :

-- TAG-UEASSISTANCEINFORMATION-STOP
-- ASN1STOP
```

UEAssistanceInformation field descriptions

| stationaryStatus |
| --- |
| Indicates whether the UE is in stationary status specified in TS38.304, clause 5.2.4.9.3. |

FIG. 16

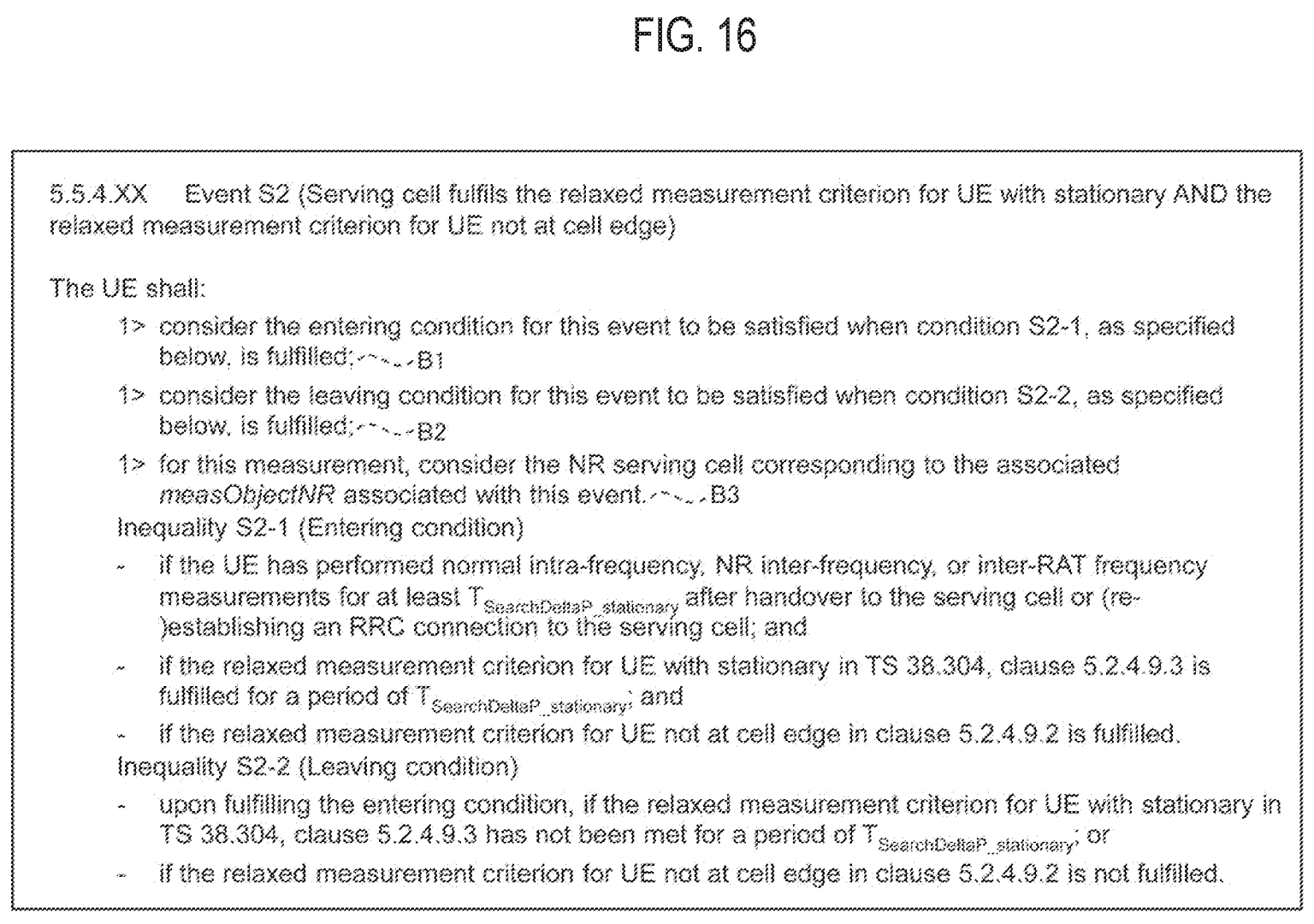

5.5.4.XX    Event S2 (Serving cell fulfils the relaxed measurement criterion for UE with stationary AND the relaxed measurement criterion for UE not at cell edge)

The UE shall:

1> consider the entering condition for this event to be satisfied when condition S2-1, as specified below, is fulfilled; ~~~-B1

1> consider the leaving condition for this event to be satisfied when condition S2-2, as specified below, is fulfilled; ~~~-B2

1> for this measurement, consider the NR serving cell corresponding to the associated measObjectNR associated with this event. ~~~-B3

Inequality S2-1 (Entering condition)

~    if the UE has performed normal intra-frequency, NR inter-frequency, or inter-RAT frequency measurements for at least $T_{SearchDeltaP\_stationary}$ after handover to the serving cell or (re-)establishing an RRC connection to the serving cell; and ~    if the relaxed measurement criterion for UE with stationary in TS 38.304, clause 5.2.4.9.3 is fulfilled for a period of $T_{SearchDeltaP\_stationary}$; and

-    if the relaxed measurement criterion for UE not at cell edge in clause 5.2.4.9.2 is fulfilled.

Inequality S2-2 (Leaving condition)

-    upon fulfilling the entering condition, if the relaxed measurement criterion for UE with stationary in TS 38.304, clause 5.2.4.9.3 has not been met for a period of $T_{SearchDeltaP\_stationary}$; or

-    if the relaxed measurement criterion for UE not at cell edge in clause 5.2.4.9.2 is not fulfilled.

FIG. 17

OtherConfig information element

```
OverheatingAssistanceConfig ::= SEQUENCE {
    overheatingIndicationProhibitTimer    ENUMERATED {s0, s0dot5, s1, s2, s5,
    s10, s20, s30, s60, s90, s120, s300, s600, spare3, spare2, spare1}
}

StationaryAndNot-at-cell-edgeConfig-r17 ::= SEQUENCE {
    stationaryAndNot-at-cell-edgeStatusProhibitTimer-r17 ENUMERATED {s0,
    s0dot5, s1, s2, s5, s10, s20, s30, s60, s90, s120, s300, s600, spare3, spare2,
    spare1}
}
```

OtherConfig field descriptions stationaryAndNot-at-cell-edgeStatusConfig
Configuration for the UE to report assistance information to inform the gNB about UE detected stationary and not-at-cell-edge status.

stationaryAndNot-at-cell-edgeStatusProhibitTimer
Prohibit timer for stationary and not-at-cell-edge status information reporting. Value in seconds. Value s0 means prohibit timer is set to 0 seconds, value s0dot5 means prohibit timer is set to 0.5 seconds, value s1 means prohibit timer is set to 1 second and so on.

| Timer | Start | Stop | At expiry |
|---|---|---|---|
| Tyyy | Upon transmitting UEAssistanceInformation message with stationaryAndNot-at-cell-edgeStatus. | Upon releasing stationaryAndNot-at-cell-edgeStatusConfig during the connection re-establishment/resume procedures, or upon receiving stationaryAndNot-at-cell-edgeStatusConfig set to release. | No action. |

FIG. 18

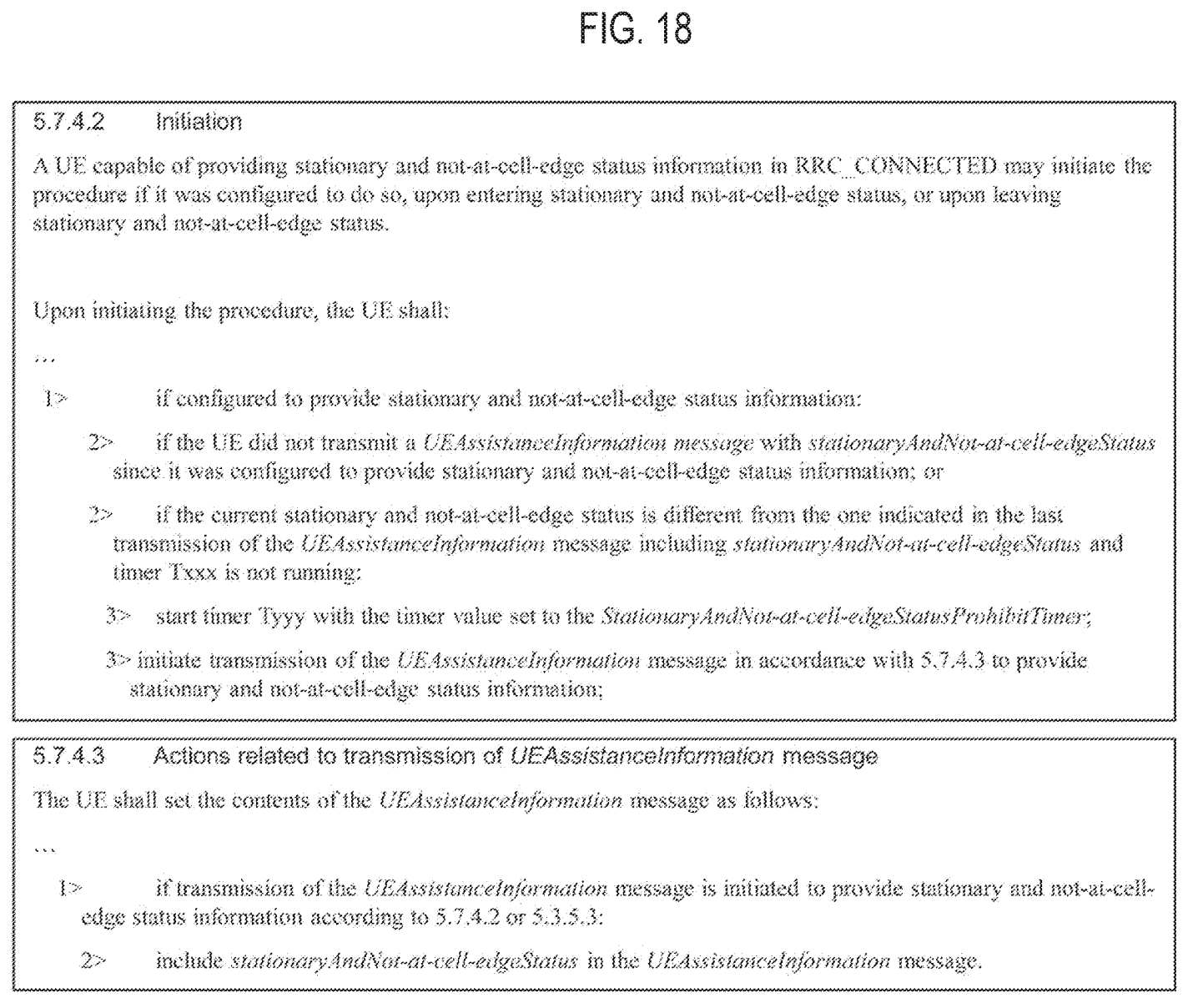

5.7.4.2    Initiation

A UE capable of providing stationary and not-at-cell-edge status information in RRC_CONNECTED may initiate the procedure if it was configured to do so, upon entering stationary and not-at-cell-edge status, or upon leaving stationary and not-at-cell-edge status.

Upon initiating the procedure, the UE shall:

...

1>    if configured to provide stationary and not-at-cell-edge status information:

2>    if the UE did not transmit a *UEAssistanceInformation message* with *stationaryAndNot-at-cell-edgeStatus* since it was configured to provide stationary and not-at-cell-edge status information; or 2>    if the current stationary and not-at-cell-edge status is different from the one indicated in the last transmission of the *UEAssistanceInformation message* including *stationaryAndNot-at-cell-edgeStatus* and timer Txxx is not running:

3>    start timer Tyyy with the timer value set to the *StationaryAndNot-at-cell-edgeStatusProhibitTimer*;

3>    initiate transmission of the *UEAssistanceInformation message* in accordance with 5.7.4.3 to provide stationary and not-at-cell-edge status information;

5.7.4.3    Actions related to transmission of *UEAssistanceInformation message*

The UE shall set the contents of the *UEAssistanceInformation message* as follows:

...

1>    if transmission of the *UEAssistanceInformation message* is initiated to provide stationary and not-at-cell-edge status information according to 5.7.4.2 or 5.3.5.3:

2>    include *stationaryAndNot-at-cell-edgeStatus* in the *UEAssistanceInformation message*.

FIG. 19

*UEAssistanceInformation message*

```
-- ASN1START
-- TAG-UEASSISTANCEINFORMATION-START

UEAssistanceInformation-v17-IEs ::= SEQUENCE {
    [ stationaryAndNot-at-cell-edgeStatus-r17 ]    BOOLEAN
OPTIONAL,
    ...
}

-- TAG-UEASSISTANCEINFORMATION-STOP
-- ASN1STOP
```

*UEAssistanceInformation field descriptions* stationaryAndNot-at-cell-edgeStatus
Indicates whether the UE is in stationary and not-at-cell-edge status specified in TS38.304, clause 5.2.4.9.2 and 5.2.4.9.3.

FIG. 21

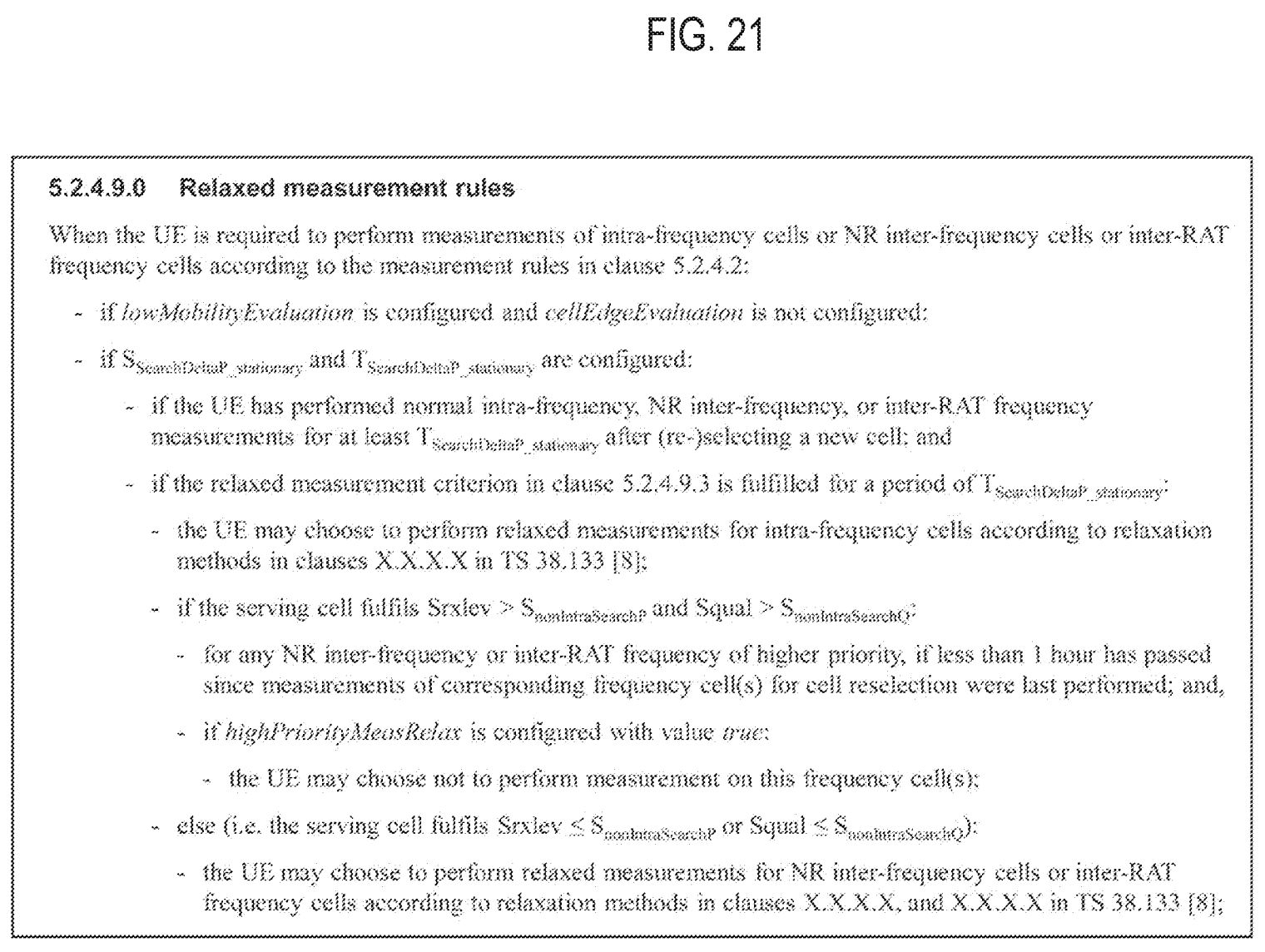

5.2.4.9.0    Relaxed measurement rules

When the UE is required to perform measurements of intra-frequency cells or NR inter-frequency cells or inter-RAT frequency cells according to the measurement rules in clause 5.2.4.2:

- if *lowMobilityEvaluation* is configured and *cellEdgeEvaluation* is not configured:
- if $S_{SearchDeltaP\_stationary}$ and $T_{SearchDeltaP\_stationary}$ are configured:
  - if the UE has performed normal intra-frequency, NR inter-frequency, or inter-RAT frequency measurements for at least $T_{SearchDeltaP\_stationary}$ after (re-)selecting a new cell; and
- if the relaxed measurement criterion in clause 5.2.4.9.3 is fulfilled for a period of $T_{SearchDeltaP\_stationary}$:
  - the UE may choose to perform relaxed measurements for intra-frequency cells according to relaxation methods in clauses X.X.X.X in TS 38.133 [8];
  - if the serving cell fulfils Srxlev > $S_{nonIntraSearchP}$ and Squal > $S_{nonIntraSearchQ}$:
    - for any NR inter-frequency or inter-RAT frequency of higher priority, if less than 1 hour has passed since measurements of corresponding frequency cell(s) for cell reselection were last performed; and,
    - if *highPriorityMeasRelax* is configured with value *true*:
      - the UE may choose not to perform measurement on this frequency cell(s);
  - else (i.e. the serving cell fulfils Srxlev < $S_{nonIntraSearchP}$ or Squal < $S_{nonIntraSearchQ}$):
    - the UE may choose to perform relaxed measurements for NR inter-frequency cells or inter-RAT frequency cells according to relaxation methods in clauses X.X.X.X and X.X.X.X in TS 38.133 [8];

FIG. 22

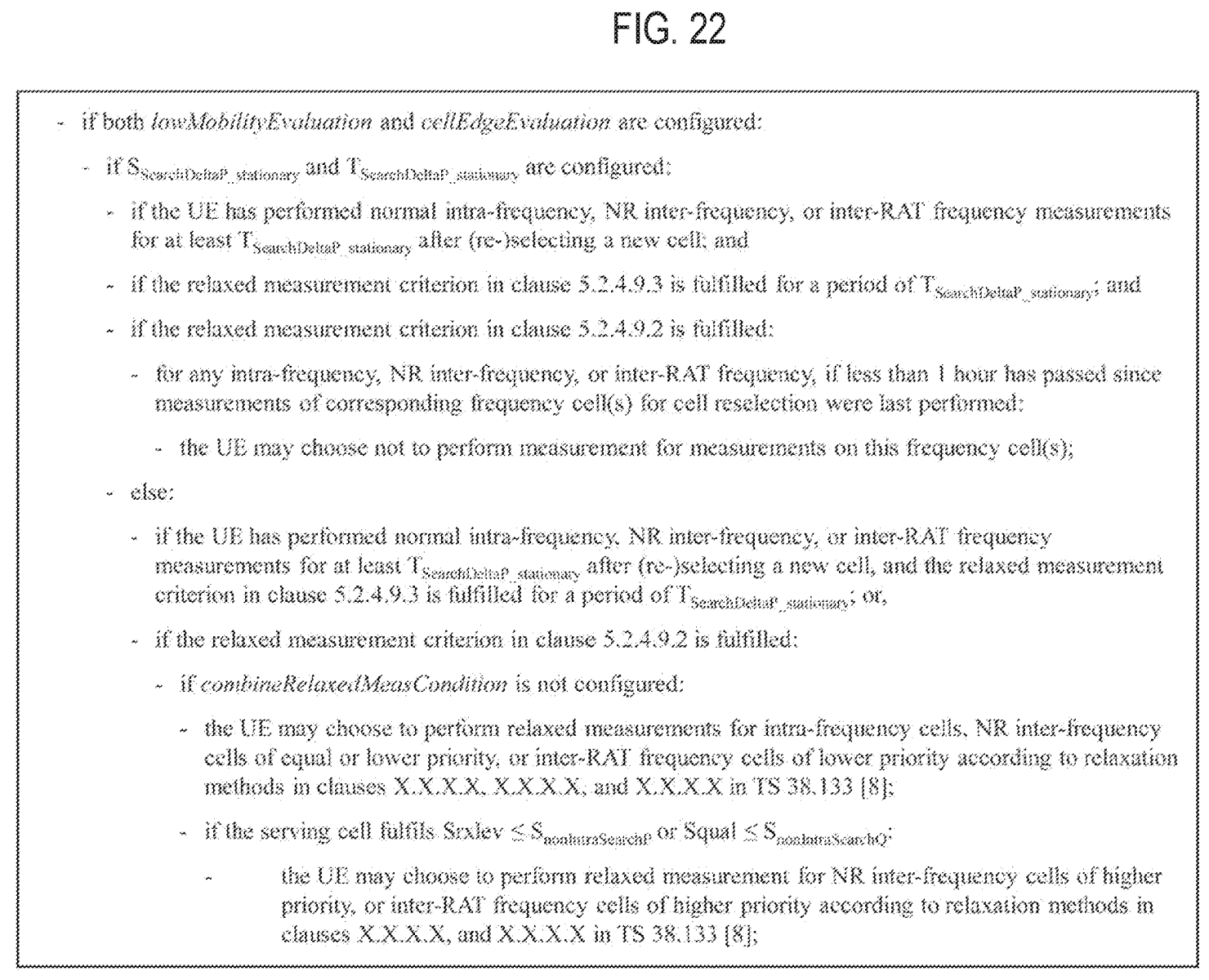

- if both *lowMobilityEvaluation* and *cellEdgeEvaluation* are configured:

- if $S_{SearchDeltaP\_stationary}$ and $T_{SearchDeltaP\_stationary}$ are configured:

- if the UE has performed normal intra-frequency, NR inter-frequency, or inter-RAT frequency measurements for at least $T_{SearchDeltaP\_stationary}$ after (re-)selecting a new cell; and

- if the relaxed measurement criterion in clause 5.2.4.9.3 is fulfilled for a period of $T_{SearchDeltaP\_stationary}$; and

- if the relaxed measurement criterion in clause 5.2.4.9.2 is fulfilled:

- for any intra-frequency, NR inter-frequency, or inter-RAT frequency, if less than 1 hour has passed since measurements of corresponding frequency cell(s) for cell reselection were last performed:

- the UE may choose not to perform measurement for measurements on this frequency cell(s);

- else:

- if the UE has performed normal intra-frequency, NR inter-frequency, or inter-RAT frequency measurements for at least $T_{SearchDeltaP\_stationary}$ after (re-)selecting a new cell, and the relaxed measurement criterion in clause 5.2.4.9.3 is fulfilled for a period of $T_{SearchDeltaP\_stationary}$; or,

- if the relaxed measurement criterion in clause 5.2.4.9.2 is fulfilled:

- if *combineRelaxedMeasCondition* is not configured:

- the UE may choose to perform relaxed measurements for intra-frequency cells. NR inter-frequency cells of equal or lower priority, or inter-RAT frequency cells of lower priority according to relaxation methods in clauses X.X.X.X, X.X.X.X, and X.X.X.X in TS 38.133 [8];

- if the serving cell fulfils $Srxlev \leq S_{nonIntraSearchP}$ or $Squal \leq S_{nonIntraSearchQ}$:

- the UE may choose to perform relaxed measurement for NR inter-frequency cells of higher priority, or inter-RAT frequency cells of higher priority according to relaxation methods in clauses X.X.X.X, and X.X.X.X in TS 38.133 [8];

-

COMMUNICATION APPARATUS, BASE STATION, AND COMMUNICATION METHOD

CROSS-REFERENCE TO RELATED APPLICATIONS

The present application is a continuation application of international Patent Application No. PCT/JP2022/027137, filed on Jul. 8, 2022, which designated the U.S., and claims the benefit of priority of Japanese Patent Application No. 2021-114620, filed on Jul. 9, 2021, the entire contents of which are incorporated herein by reference.

TECHNICAL FIELD

The present disclosure relates to a communication apparatus, a base station, and a communication method.

BACKGROUND ART

In recent years, in the 3rd generation partnership project (3GPP) (registered trademark; the same applies hereinafter), which is a standardization project of a mobile communication system, it has been studied to provide a specific communication apparatus having a lower communication capability than that of a general communication apparatus in a 5G system (refer to Non Patent Literature 1). The specific communication apparatus is a communication apparatus having middle range performance and price for Internet of Things (IoT), and for example, a maximum bandwidth used for radio communication is set narrower or the number of receivers is smaller as compared with the general communication apparatus.

In addition, it is agreed to introduce a method (so-called RRM (Radio Resource Management) relaxation; hereinafter, it is appropriately referred to as a measurement relaxation method) for relaxing measurement of radio quality for an adjacent cell based on a RSRP (Reference Signal Received Power)/RSRQ (Reference Signal Received Quality) based stationarity criterion to a specific communication apparatus in an RRC connected state (see Non Patent Literature 2).

The specific communication apparatus in a stationary state does not need to frequently execute measurement of radio quality for an adjacent cell because a radio environment varies little. By regarding the specific communication apparatus as a communication apparatus in a stationary state when the stationarity criterion is fulfilled, the number of measurements can be reduced by the measurement relaxation method. As a result, power saving and battery life improvement can be achieved.

CITATION LIST

Non Patent Literature

Non Patent Literature 1: 3GPP Contribution "RP-201677"
Non Patent Literature 2: 3GPP Contribution "R2-2106472"

SUMMARY OF INVENTION

A communication apparatus according to a first aspect comprises: a communicator configured to transmit a user equipment (UE) assistance information message including information indicating whether or not a stationarity criterion regarding measurement relaxation in a radio resource control (RRC) connected state is fulfilled to a base station.

A base station according to a second aspect comprises: a communicator configured to receive, from a communication apparatus, a user equipment (UE) assistance information message including information indicating whether or not a stationarity criterion regarding measurement relaxation in a radio resource control (RRC) connected state is fulfilled.

A communication method according to a third aspect is executed by a communication apparatus. The communication method comprises the step of: transmitting a user equipment (UE) assistance information message including information indicating whether or not a stationarity criterion regarding measurement relaxation in a radio resource control (RRC) connected state is fulfilled to a base station.

BRIEF DESCRIPTION OF DRAWINGS

Objects, features, advantages, and the like of the present disclosure will become more apparent from the following detailed description with reference to the accompanying drawings.

FIG. 2 is a diagram illustrating a configuration example of a protocol stack according to the embodiment.

FIG. 3 is a diagram illustrating a configuration of a UE according to the embodiment.

FIG. 5 is a sequence diagram illustrating a first operation example and a third operation example of the mobile communication system according to the embodiment.

FIG. 6 is a diagram illustrating an example of information according to the embodiment.

FIG. 7 is a diagram illustrating an example of information according to the embodiment.

FIG. 8 is a diagram illustrating a first operation example of the mobile communication system according to the embodiment.

FIG. 9 is a diagram illustrating a first operation example of the mobile communication system according to the embodiment.

FIG. 10 is a diagram illustrating a first operation example of the mobile communication system according to the embodiment.

FIG. 11 is a diagram illustrating a first operation example of the mobile communication system according to the embodiment.

FIG. 13 is a diagram illustrating an example of information according to the embodiment.

FIG. 14 is a diagram illustrating a first operation example of the mobile communication system according to the embodiment.

FIG. 15 is a diagram illustrating an example of information according to the embodiment.

FIG. 16 is a diagram illustrating a third operation example of the mobile communication system according to the embodiment.

FIG. 17 is a diagram illustrating an example of information according to the embodiment.

FIG. 18 is a diagram illustrating a fourth operation example of the mobile communication system according to the embodiment.

FIG. 19 is a diagram illustrating an example of information according to the embodiment.

FIG. 21 is a diagram illustrating a fifth operation example of the mobile communication system according to the embodiment.

FIG. 22 is a diagram illustrating a fifth operation example of the mobile communication system according to the embodiment.

DESCRIPTION OF EMBODIMENTS

Figure 1:
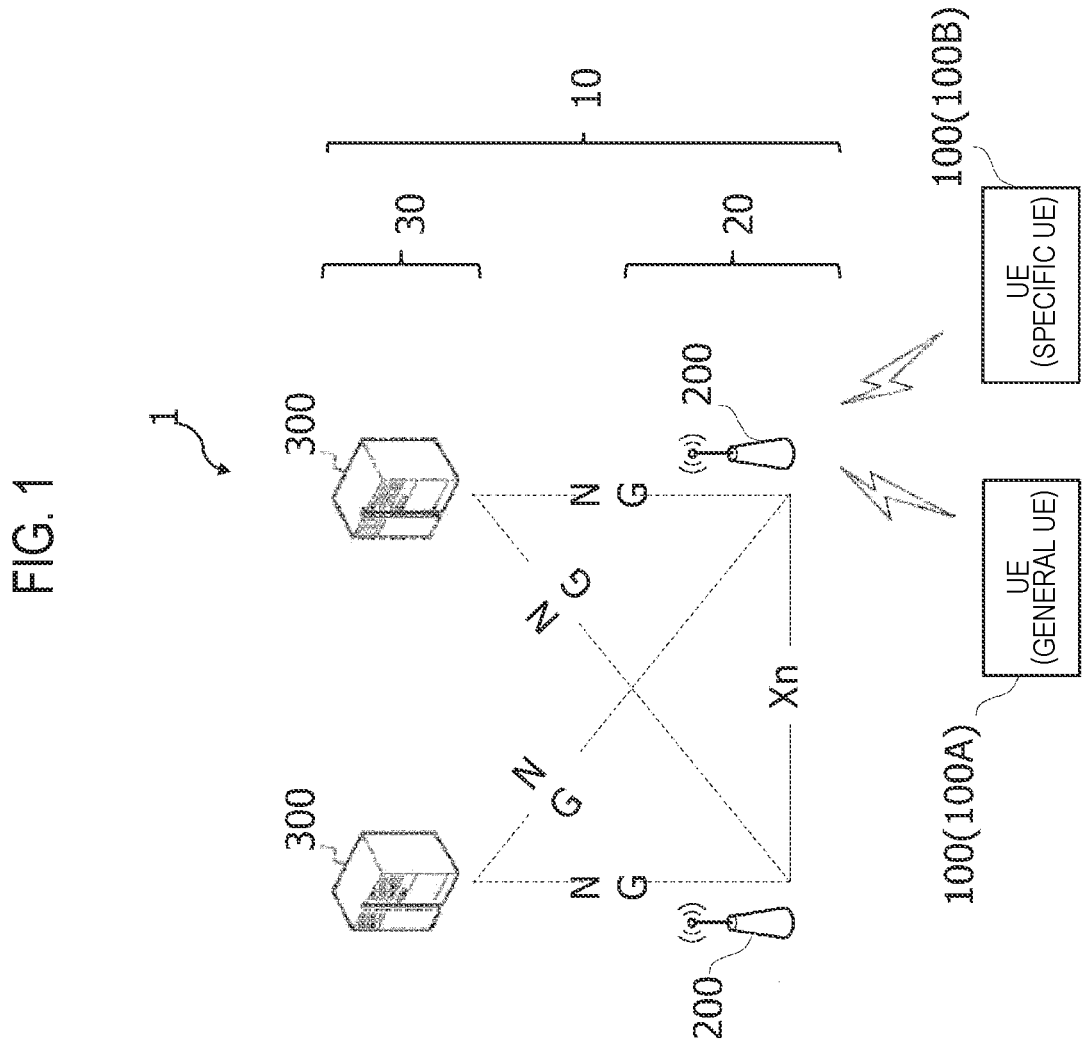
FIG. 1 is a diagram illustrating a configuration of a mobile communication system according to an embodiment.

A mobile communication system according to an embodiment will be described with reference to the drawings. In the description of the drawings, the same or similar parts are denoted by the same or similar reference numerals.

Currently, it is considered to enable measurement according to a measurement relaxation method by a network for a specific communication apparatus in an RRC connected state. However, in the existing 3GPP technical specification, there is no specific mechanism for the network to know that the specific communication apparatus fulfills a stationarity criterion. For this reason, it is difficult for the network to enable measurement according to the measurement relaxation method based on that the specific communication apparatus fulfills the stationarity criterion. Note that, for a general communication apparatus, there is a similar concern when the measurement relaxation method based on the stationarity criterion is introduced. Therefore, an object of the present disclosure is to provide a communication apparatus, a base station, and a communication method that enable a network to know that a stationarity criterion is fulfilled.

(System Configuration)

First, a configuration of a mobile communication system 1 according to the present embodiment will be described with reference to FIG. 1. The mobile communication system 1 is, for example, a system conforming to a technical specification (TS) of 3GPP. Hereinafter, as the mobile communication system 1, the 5th generation system (5GS) of the 3GPP standard, that is, a mobile communication system based on NR (New Radio) radio access is exemplified.

The mobile communication system 1 includes a network 10 and a user equipment (UE) 100 that communicates with the network 10. The network 10 includes a NG-RAN (Next Generation Radio Access Network) 20, which is a 5G radio access network, and a 5GC (5G Core Network) 30, which is a 5G core network.

The UE 100 is an example of a communication apparatus. The UE 100 may be a mobile radio communication apparatus. The UE 100 may be an apparatus used by a user. The UE 100 is, for example, a mobile apparatus such as a mobile phone terminal such as a smartphone, a tablet terminal, a notebook PC, a communication module, or a communication card. The UE 100 may be a vehicle (for example, a car, a train, or the like) or an apparatus (for example, a vehicle UE) provided in the vehicle. The UE 100 may be a transport body other than the vehicle (for example, a ship, an airplane, or the like) or an apparatus provided in the transport body. The UE 100 may be a sensor or an apparatus provided in the sensor. Note that the UE 100 may be referred to as another name such as a mobile station, a mobile terminal, a mobile apparatus, a mobile unit, a subscriber station, a subscriber terminal, a subscriber apparatus, a subscriber unit, a wireless station, a wireless terminal, a wireless apparatus, a wireless unit, a remote station, a remote terminal, a remote apparatus, or a remote unit.

In the present embodiment, as the UE 100 of NR, two types of UEs are assumed, that is, a general UE 100A and a specific UE 100B having a lower communication capability than that of the general UE 100A. The general UE 100A has an advanced communication capability such as a high speed and high capacity (enhanced Mobile Broadband: eMBB) and ultra-reliable low delay (Ultra-Reliable and Low Latency Communications: URLLC), which are characteristics of NR. The specific UE 100B is a UE whose apparatus cost and complexity are reduced as compared with the general UE 100A. The specific UE 100B is the UE 100 having the performance and price of the middle range for the IoT, and for example, the maximum bandwidth used for the radio communication is set narrower or the number of receivers is smaller than that of the general UE 100A. Note that the receiver may be referred to as a reception branch. The specific UE 100B may be referred to as a reduced capability NR device or a RedCap UE.

Specifically, the specific UE 100B may be capable of communicating at a communication speed equal to or higher than a communication speed defined by a LPWA (Low Power Wide Area) standard, for example, LTE Cat.1/1bis, LTE Cat.M1 (LTE-M), and LTE Cat.NB1 (NB-IoT). The specific UE 100B may be capable of communicating with a bandwidth equal to or larger than a bandwidth defined by the LPWA standard. The specific UE 100B may have a restricted bandwidth used for communication as compared with the UE of Rel-15 or Rel-16. For example, regarding a FR1 (Frequency Range 1), the maximum bandwidth of the specific UE 100B may be 20 MHz. In addition, regarding a FR2 (Frequency Range 2), for example, the maximum bandwidth of the specific UE 100B may be 100 MHz. The specific UE 100B may have only one receiver that receives a radio signal. The specific UE 100B may be, for example, a wearable apparatus, a sensor apparatus, or the like.

The NG-RAN 20 includes a plurality of base stations 200. Each of the base stations 200 manages at least one cell. A cell forms a minimum unit of a communication area. One cell belongs to one frequency (carrier frequency). The term "cell" may represent a radio communication resource, and may also represent a communication object of the UE 100. Each base station 200 can perform radio communication with the UE 100 existing in its own cell. The base station 200 communicates with the UE 100 by using a protocol stack of the RAN. Details of the protocol stack will be described later. Further, the base station 200 is connected to another base station 200 (which may also be referred to as an adjacent base station) via an Xn interface. The base station 200 communicates with the adjacent base station via the Xn interface. In addition, the base station 200 provides NR user plane and control plane protocol terminations towards the UE 100 and is connected to the 5GC 30 via the NG interface. Such an NR base station 200 may be referred to as a gNodeB (gNB).

The 5GC 30 includes a core network apparatus 300. The core network apparatus 300 includes, for example, an AMF (Access and Mobility Management Function) and/or a UPF (User Plane Function). The AMF performs mobility management of the UE 100. The UPF provides a function specialized for U-plane processing. The AMF and the UPF are connected to the base station 200 via the NG interface.

(Configuration Example of Protocol Stack)

Figure 2:
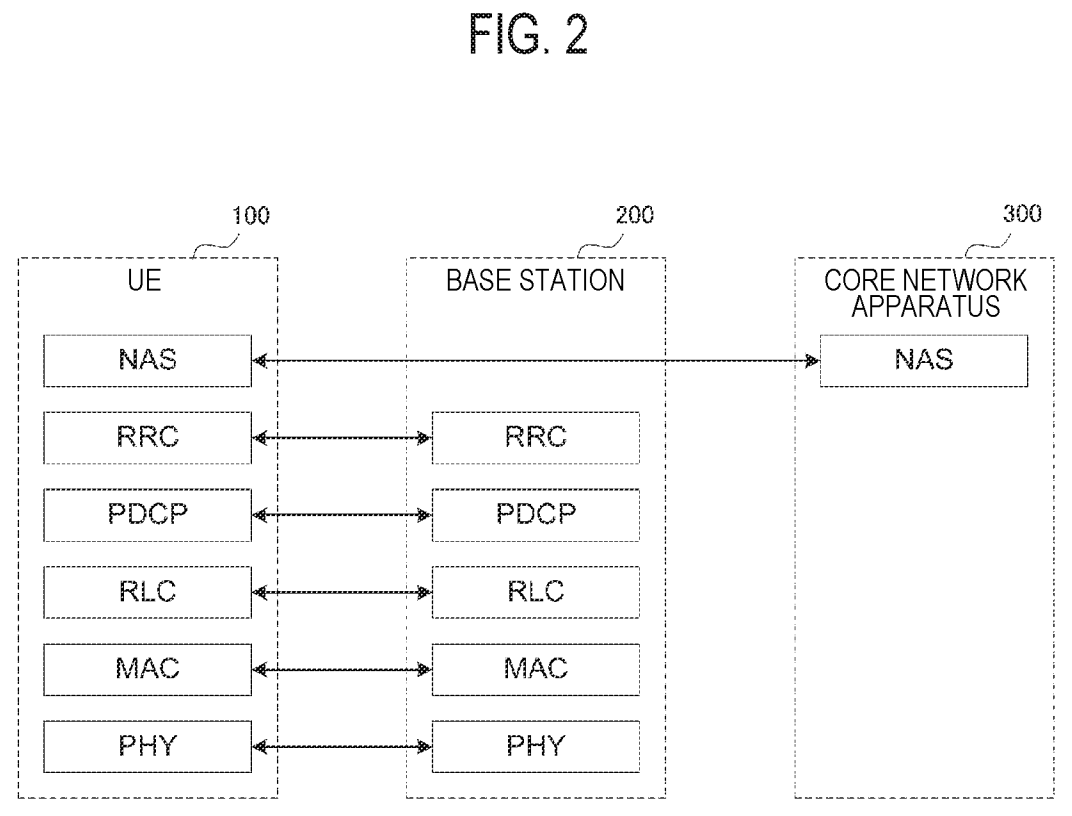

Next, a configuration example of the protocol stack according to the present embodiment will be described with reference to FIG. 2.

A protocol of a radio section between the UE 100 and the base station 200 includes a physical (PHY) layer, a MAC (Medium Access Control) layer, a RLC (Radio Link Control) layer, a PDCP (Packet Data Convergence Protocol) layer, and a RRC (Radio Resource Control) layer.

The PHY layer performs encoding/decoding, modulation/demodulation, antenna mapping/demapping, and resource mapping/demapping. Data and control information are transmitted between the PHY layer of the UE 100 and the PHY layer of the base station 200 via a physical channel.

The MAC layer performs priority control of data, retransmission processing by hybrid ARQ (Hybrid Automatic Repeat reQuest (HARQ)), a random access procedure, and the like. Data and control information are transmitted between the MAC layer of the UE 100 and the MAC layer of the base station 200 via a transport channel. The MAC layer of the base station 200 includes a scheduler. The scheduler determines uplink and downlink transport formats (transport block size, modulation and coding scheme (MCS)), and allocated resources to the UE 100.

The RLC layer transmits data to the RLC layer on the reception side using the functions of the MAC layer and the PHY layer. Data and control information are transmitted between the RLC layer of the UE 100 and the RLC layer of the base station 200 via a logical channel.

The PDCP layer performs header compression/decompression and encryption/decryption.

A SDAP (Service Data Adaptation Protocol) layer may be provided as an upper layer of the PDCP layer. The SDAP (Service Data Adaptation Protocol) layer performs mapping between an IP flow to be a unit in which a core network performs QoS (Quality of Service) control, and a radio bearer to be a unit in which an AS (Access Stratum) performs QoS control.

The RRC layer controls a logical channel, a transport channel, and a physical channel according to establishment, reestablishment, and release of the radio bearer. RRC signaling for various configurations is transmitted between the RRC layer of the UE 100 and the RRC layer of the base station 200. In a case where there is an RRC connection between the RRC of the UE 100 and the RRC of the base station 200, the UE 100 is in an RRC connected state. In a case where there is no RRC connection between the RRC of the UE 100 and the RRC of the base station 200, the UE 100 is in an RRC idle state. In a case where the RRC connection between the RRC of the UE 100 and the RRC of the base station 200 is suspended, the UE 100 is in an RRC inactive state.

A NAS layer located above the RRC layer in the UE 100 performs session management and mobility management of the UE 100. NAS signaling is transmitted between the NAS layer of the UE 100 and the NAS layer of the core network apparatus 300.

Note that the UE 100 has an application layer and the like in addition to the protocol of the radio interface.

(Configuration of User Equipment)

Figure 3:
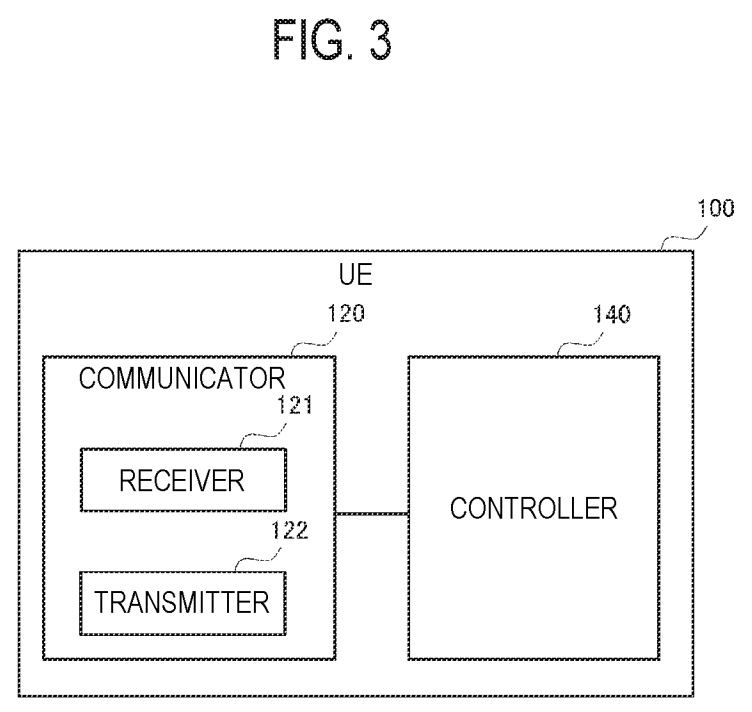

Next, a configuration of the UE 100 according to the present embodiment will be described with reference to FIG. 3. The UE 100 includes a communicator 120 and a controller 140.

The communicator 120 performs radio communication with the base station 200 by transmitting and receiving a radio signal to and from the base station 200. The communicator 120 includes at least one receiver 121 and at least one transmitter 122. The receiver 121 and the transmitter 122 may be configured to include an antenna and an RF circuit. The antenna converts a signal into a radio wave and emits the radio wave into space. Further, the antenna receives a radio wave in space and converts the radio wave into a signal. The RF circuit performs analog processing of a signal transmitted and received via the antenna. The RF circuit may include a high frequency filter, an amplifier, a modulator, a low pass filter, and the like.

The receiver 121 may be referred to as a receiver (RX: Receiver). The transmitter 122 may be referred to as a transmitter (TX: Transmitter). When the UE 100 is the general UE 100A, the number of receivers included in the communicator 120 may be two to four. When the UE 100 is the specific UE 100B, the number of receivers included in the communicator 120 may be one or two.

The controller 140 performs various types of control in the UE 100. The controller 140 controls communication with the base station 200 via the communicator 120. Operation of the UE 100 to be described later may be operation under the control of the controller 140. The controller 140 may include at least one processor capable of executing a program and a memory that stores the program. The processor may execute the program to perform the operation of the controller 140. The controller 140 may include a digital signal processor that performs digital processing of a signal transmitted and received via the antenna and the RF circuit. The digital processing includes processing of the protocol stack of the RAN. Note that the memory stores a program executed by the processor, a parameter related to the program, and data related to the program. The memory may include at least one of a ROM (Read Only Memory), an EPROM (Erasable Programmable Read Only Memory), an EEPROM (Electrically Erasable Programmable Read Only Memory), a RAM (Random Access Memory), and a flash memory. All or a part of the memory may be included in the processor.

In the UE 100 configured as described above, the communicator 120 receives, from the serving cell, a stationary threshold applied to a stationarity criterion which is a criterion used for selecting whether or not to execute measurement according to a measurement relaxation method for relaxing measurement of radio quality for an adjacent cell and is a criterion for determining whether or not the UE 100 is in a stationary state. The controller 140 measures at least one of received power and received quality as the radio quality of the serving cell. The controller 140 determines whether or not the stationarity criterion is fulfilled based on a measurement result of the radio quality and the stationary threshold. As a result, the controller 140 determines whether or not the stationarity criterion is fulfilled based on the measurement result of the radio quality and the stationary threshold, so that the measurement according to the measurement relaxation method can be appropriately executed.

When the stationary threshold includes a quality threshold to be compared with a value calculated based on the received quality, the controller 140 may determine whether or not the stationarity criterion is fulfilled based on the quality threshold regardless of whether or not the stationary threshold includes a power threshold to be compared with a value calculated based on the received power. As a result, for example, it is possible to determine whether or not the stationarity criterion is fulfilled in consideration of an influence of the communication quality due to interference, noise, and the like, as compared with the case of determining whether or not the stationarity criterion is fulfilled based on the received power.

When the stationary threshold includes a quality threshold to be compared with the value calculated based on the received quality and a power threshold to be compared with the value calculated based on the received power, the controller 140 may determine whether or not the stationarity criterion is fulfilled based on the quality threshold and the power threshold. Thereby, it is possible to determine whether or not the stationarity criterion is fulfilled based on both the received quality and the received power, so that the stationarity criterion is not fulfilled when the radio quality is poor. Therefore, measurement according to the measurement relaxation method can be appropriately performed.

When the stationary threshold does not include the quality threshold but includes the power threshold, the controller 140 may determine whether or not the stationarity criterion is fulfilled based on the power threshold. Thereby, for example, in an environment such as an isolated cell in which there is no interference from an adjacent cell and the traffic of the own cell is low, the stationary state can be appropriately determined only by determination based on the received power.

When it is determined that the stationarity criterion is fulfilled, the communicator 120 may transmit a message indicating that the stationarity criterion is fulfilled to the serving cell. Thereby, the network can know that the UE 100 fulfills the stationarity criterion.

In a case where it is determined that the stationarity criterion is fulfilled, the controller 140 may select to execute the measurement for the adjacent cell according to the measurement relaxation method. Thereby, the UE 100 can execute measurement for the adjacent cell according to the measurement relaxation method.

The communicator 120 may receive a radio resource control (RRC) message including the stationary threshold from the serving cell. Thereby, the network can control the measurement according to the measurement relaxation method.

The communicator 120 may further receive, from the serving cell, a low mobility threshold applied to a low mobility criterion indicating that the user equipment is in a low mobility state. The stationary threshold may be different from the low mobility threshold.

In addition, the controller 140 determines whether or not a stationarity criterion which is a criterion used for selecting whether or not to execute measurement according to a measurement relaxation method for relaxing measurement of radio quality for an adjacent cell and is a criterion for determining whether or not the UE 100 is in a stationary state is fulfilled. In response to the stationarity criterion being fulfilled, the communicator 120 transmits, to the network, a radio resource control (RRC) message indicating that the stationarity criterion is fulfilled. As a result, the network can know that the stationarity criterion is fulfilled in the UE 100 by the RRC message. Thereby, the network can enable measurement according to a measurement relaxation method based on that the user equipment fulfills the stationarity criterion.

The RRC message may be a measurement report message for transferring the measurement result of the radio quality to the network. The network can know, by the measurement report message, not only that the stationarity criterion is fulfilled, but also the measurement result.

When a condition for entering a stationary event indicating that the stationarity criterion is fulfilled is fulfilled, the controller 140 may include a measurement identifier associated with an identifier of the stationary event in the measurement report message. Thereby, the network can know, based on the measurement identifier, that the condition for entering the stationary event is fulfilled.

The RRC message may be a UE assistance information message used to indicate information of the UE 100 to the network. Thereby, the network can know, by the UE assistance information message, that the stationarity criterion is fulfilled.

The controller 140 may include state information indicating that the UE 100 is in a stationary state in the UE assistance information message. Thereby, the network can know that the UE 100 is in a stationary state.

The communicator 120 may receive configuration information for providing the state information to the network from the network. In a case where the UE assistance information message has not been transmitted after receiving the configuration information, the controller 140 may start to transmit the UE assistance information message. As a result, the network can know the stationary state of the UE 100 by transmitting the configuration information to the UE 100.

When the state information indicating that the UE 100 is not in a stationary state is included in the UE assistance information message lastly transmitted to the network, the controller 140 may start to transmit the UE assistance information message in response to the stationarity criterion being fulfilled. As a result, the network can know that the stationarity criterion is fulfilled in the UE 100 that is not in a stationary state.

The controller 140 may start a prohibit timer in response to the transmission of the UE assistance information message including the state information. When the prohibit timer is running, the communicator 120 may not transmit a next UE assistance information message including the state information. As a result, in a case where the stationary state of the UE 100 is frequently switched in a short time, it is not necessary to transmit the RRC message every time the stationary state is switched, and an increase in signaling can be reduced.

The controller 140 determines whether or not a stationarity criterion which is a criterion used for selecting whether or not to execute measurement according to a measurement relaxation method for relaxing measurement of radio quality for an adjacent cell and is a criterion for determining whether or not the UE 100 is in a stationary state is fulfilled. In response to the stationarity criterion being not fulfilled, the communicator 120 transmits, to the network, a radio resource control (RRC) message indicating that the stationarity criterion is not fulfilled. As a result, the network can know that the stationarity criterion is not fulfilled.

In a case where a leaving condition from the stationary event indicating that the stationarity criterion is fulfilled is fulfilled, the controller 140 may include the measurement identifier associated with the identifier of the stationary event in the measurement report message. Thereby, the network can know, based on the measurement identifier, that the leaving condition from the stationary event is fulfilled.

The controller 140 may include state information indicating that the UE 100 is not in a stationary state in the UE assistance information message. Thereby, the network can know that the UE 100 is not in a stationary state.

When the state information indicating that the UE 100 is in a stationary state is included in the UE assistance information message lastly transmitted to the network, the controller 140 may start to transmit the UE assistance information message in response to the stationarity criterion being not fulfilled. Thereby, the network can know that the stationarity criterion is not fulfilled in the UE 100 in a stationary state.

The controller 140 determines whether or not a stationarity criterion, which is a criterion used for selecting whether or not to execute measurement according to a measurement relaxation method for relaxing measurement of radio quality for an adjacent cell and is a criterion for determining whether or not the UE 100 is in a stationary state is fulfilled, and a non-cell edge criterion, which is a criterion used for selecting whether or not to execute measurement according to the measurement relaxation method and is a criterion for determining whether or not the UE 100 is in a non-cell edge state where it is not at a cell edge of the serving cell, are fulfilled. In response to both the stationarity criterion and the non-cell edge criterion being fulfilled, the communicator 120 transmits, to the network, a radio resource control (RRC) message indicating that both the stationarity criterion and the non-cell edge criterion are fulfilled. Thereby, the network can know that both the stationarity criterion and the non-cell edge criterion are fulfilled.

The controller 140 may include a measurement identifier associated with an identifier of a stationary and non-cell edge event in the measurement report message when a condition for entering the stationary and non-cell edge event indicating that both the stationarity criterion and the non-cell edge criterion are fulfilled is fulfilled. Thereby, the network can know, based on the measurement identifier, that the condition for entering the stationary and non-cell edge event is fulfilled.

The controller 140 may include, in the UE assistance information message, state information indicating that the UE 100 is in a stationary state and a non-cell edge state. Thereby, the network can know that the UE 100 is in a stationary state and a non-cell edge state.

When the UE assistance information message lastly transmitted to the network includes state information indicating that the UE 100 is not in a stationary state or not in a non-cell edge state, the controller 140 may start to transmit the UE assistance information message in response to both the stationarity criterion and the non-cell edge criterion being fulfilled. Thereby, the network can know that both the stationarity criterion and the non-cell edge criterion are fulfilled in the UE 100 that is not in a stationary state or not in a non-cell edge state.

The controller 140 determines whether or not a stationarity criterion, which is a criterion used for selecting whether or not to execute measurement according to a measurement relaxation method for relaxing measurement of radio quality for an adjacent cell and is a criterion for determining whether or not the UE 100 is in a stationary state is fulfilled, and a non-cell edge criterion, which is a criterion used for selecting whether or not to execute measurement according to the measurement relaxation method and is a criterion for determining whether or not the UE 100 is in a non-cell edge state where it is not at a cell edge of the serving cell, are fulfilled. In response to at least one of the stationarity criterion and the non-cell edge criterion being not fulfilled, the communicator 120 transmits, to the network, a radio resource control (RRC) message indicating that at least one of the stationarity criterion and the non-cell edge criterion is not fulfilled. As a result, the network can know that at least one of the stationarity criterion and the non-cell edge criterion is not fulfilled.

The controller 140 may include the measurement identifier associated with the identifier of the stationary and non-cell edge event in the measurement report message when the leaving condition from the stationary and non-cell edge event indicating that both the stationarity criterion and the non-cell edge criterion are fulfilled is fulfilled. Thereby, the network can know that the leaving condition from the stationary and non-cell edge event is fulfilled based on the measurement identifier.

The controller 140 may include, in the UE assistance information message, state information indicating that the UE 100 is not in a stationary state or not in a non-cell edge state. Thereby, the network can know that the UE 100 is not in a stationary state or not in a non-cell edge state.

When the state information indicating that the UE 100 is in a stationary state and a non-cell edge state is included in the UE assistance information message lastly transmitted to the network, the controller 140 may start to transmit the UE assistance information message in response to at least one of the stationarity criterion and the non-cell edge criterion being not fulfilled. Thereby, the network can know that at least one of the stationarity criterion and the non-cell edge criterion is not fulfilled in the UE 100 in a stationary state and a non-cell edge state.

Note that the operation of the functional units (specifically, at least one of the communicator 120 and the controller 140) included in the UE 100 may be described as the operation of the UE 100.

(Configuration of Base Station)

Figure 4:
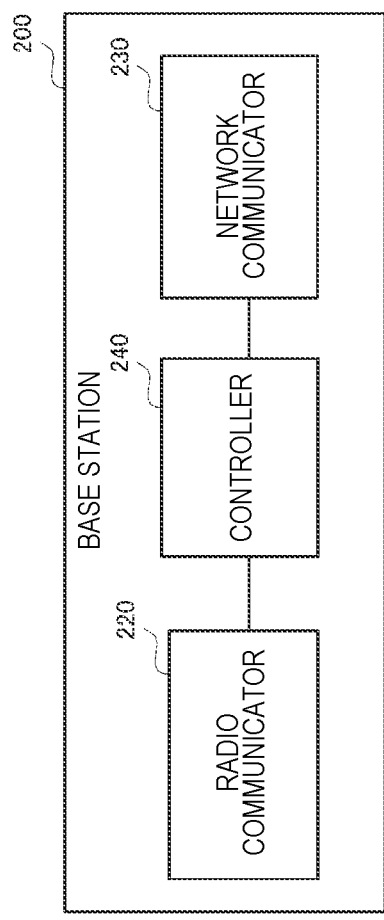
FIG. 4 is a diagram illustrating a configuration of a base station according to the embodiment.

Next, a configuration of the base station 200 according to the present embodiment will be described with reference to FIG. 4. The base station 200 includes a radio communicator 220, a network communicator 230, and a controller 240.

For example, the radio communicator 220 receives a radio signal from the UE 100 and transmits a radio signal to the UE 100. The radio communicator 220 may include one or more receivers that receive radio signals and one or more transmitters that transmit radio signals.

The network communicator 230 transmits and receives signals to and from the network. The network communicator 230 receives a signal from an adjacent base station connected via an Xn interface which is an interface between bases stations, for example, and transmits the signal to the adjacent base station. Further, the network communicator 230 receives a signal from the core network apparatus 300 connected via the NG interface, for example, and transmits the signal to the core network apparatus 300.

The controller 240 performs various types of control in the base station 200. The controller 240 controls, for example, communication with the UE 100 via the radio communicator 220. Furthermore, the controller 240 controls, for example, communication with a node (for example, the adjacent base station and the core network apparatus 300) via the network communicator 230. The operation of the base station 200 described later may be an operation under the control of the controller 240.

The controller 240 may include at least one processor capable of executing a program and a memory that stores the program. The processor may execute the program to perform the operation of the controller 240. The controller 240 may include a digital signal processor that performs digital processing of a signal transmitted and received via the antenna and the RF circuit. The digital processing includes processing of the protocol stack of the RAN. Note that the memory stores a program executed by the processor, a parameter related to the program, and data related to the program. All or a part of the memory may be included in the processor.

In the base station 200 configured as described above, the controller 240 includes, in a radio resource control (RRC) message, a stationary threshold applied to a stationarity criterion which is a criterion used for selecting whether or not to execute measurement according to a measurement relaxation method for relaxing measurement of radio quality for an adjacent cell and is a criterion for determining whether or not the UE 100 is in a stationary state. The radio communicator 220 transmits the RRC message to the user equipment. Thereby, the network can control the measurement according to the measurement relaxation method.

In addition, the radio communicator 220 receives, from the UE 100, a radio resource control (RRC) message indicating that a stationarity criterion which is a criterion used for selecting whether or not to execute measurement according to a measurement relaxation method for relaxing measurement of radio quality for an adjacent cell and is a criterion for determining whether or not the UE 100 is in a stationary state is fulfilled. The controller 240 controls the measurement of the UE 100 according to the measurement relaxation method. The network can know that the stationarity criterion is fulfilled in the UE 100 by the RRC message. Thereby, the network can control the measurement of the UE 100 according to the measurement relaxation method based on the stationarity criterion.

The radio communicator 220 may transmit the stationary threshold applied to the stationarity criterion to the UE 100. Thereby, the network can control the measurement according to the measurement relaxation method based on the stationarity criterion.

The radio communicator 220 receives, from the UE 100, a radio resource control (RRC) message indicating that a stationarity criterion which is a criterion used for selecting whether or not to execute measurement according to a measurement relaxation method for relaxing measurement of radio quality for an adjacent cell and is a criterion for determining whether or not the UE 100 is in a stationary state is not fulfilled. The controller 240 controls the measurement of the UE 100 according to the measurement relaxation method. The network can know that the stationarity criterion is not fulfilled in the UE 100 by the RRC message. Thereby, the network can control the measurement of the UE 100 according to the measurement relaxation method based on the stationarity criterion.

The radio communicator 220 receives, from the UE 100, a radio resource control (RRC) message indicating that a stationarity criterion, which is a criterion used for selecting whether or not to execute measurement according to a measurement relaxation method for relaxing measurement of radio quality for an adjacent cell and is a criterion for determining whether or not the UE 100 is in a stationary state is fulfilled, and a non-cell edge criterion, which is a criterion used for selecting whether or not to execute measurement according to the measurement relaxation method and is a criterion for determining whether or not the UE 100 is in a non-cell edge state where it is not at a cell edge of the serving cell, are fulfilled. The controller 240 controls the measurement of the UE 100 according to the measurement relaxation method. Thereby, the network can control the measurement of the UE 100 according to the measurement relaxation method.

The radio communicator 220 may transmit the stationary threshold applied to the stationarity criterion and the non-cell edge threshold applied to the non-cell edge criterion to the UE 100. Thereby, the network can control the measurement according to the measurement relaxation method based on the stationarity criterion and the non-cell edge criterion.

The radio communicator 220 receives, from the UE 100, a radio resource control (RRC) message indicating that at least one of a stationarity criterion, which is a criterion used for selecting whether or not to execute measurement according to a measurement relaxation method for relaxing measurement of radio quality for an adjacent cell and is a criterion for determining whether or not the UE 100 is in a stationary state is fulfilled, and a non-cell edge criterion, which is a criterion used for selecting whether or not to execute measurement according to the measurement relaxation method and is a criterion for determining whether or not the UE 100 is in a non-cell edge state where it is not at a cell edge of the serving cell, is not fulfilled. The controller 240 controls the measurement of the UE 100 according to the measurement relaxation method. As a result, the network can control the measurement of the UE 100 according to the measurement relaxation method based on the stationarity criterion and the non-cell edge criterion.

Note that the operation of the functional unit (specifically, at least one of the radio communicator 220, the network communicator 230, and the controller 240) included in the base station 200 may be described as the operation of the base station 200.

(System Operation)

(1) First Operation Example

A first operation example of the mobile communication system 1 will be described with reference to FIGS. 5 to 11. In the first operation example, a case in which the UE 100 transmits the measurement report message to the base station 200 according to whether or not the stationarity criterion is fulfilled will be described.

Figure 5:
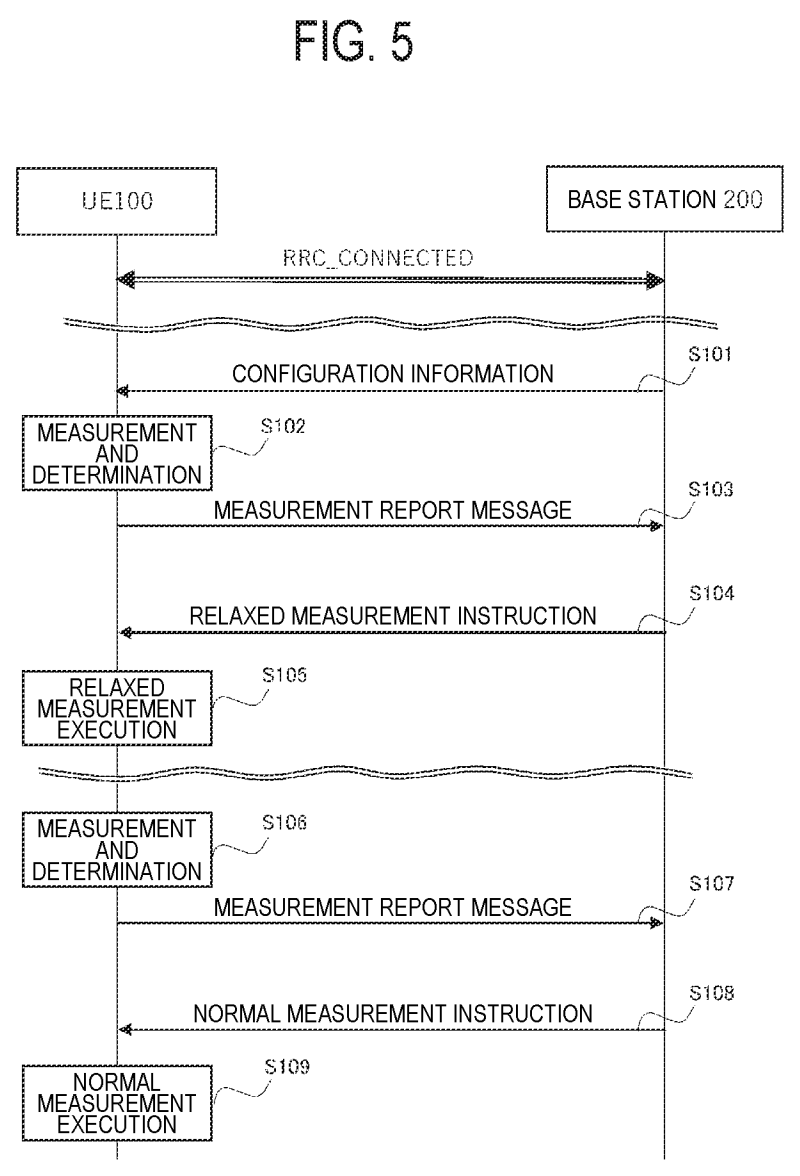

As illustrated in FIG. 5, the UE 100 is in an RRC connected state between the UE 100 and the base station 200. Therefore, the UE 100 establishes RRC connection with a cell (serving cell) C managed by the base station 200.

Hereinafter, the communication between the UE 100 and the base station 200 may be communication between the UE 100 and the serving cell for the UE 100. Furthermore, communication (transmission and/or reception) between the UE 100 and the base station 200 may be referred to as communication (transmission and/or reception) between the UE 100 and the network.

Step S101:

The radio communicator 220 of the base station 200 transmits configuration information to the UE 100. The communicator 120 of the UE 100 receives the configuration information from the base station 200 (serving cell).

The radio communicator 220 can transmit a radio resource control (RRC) message including the configuration information to the UE 100. Therefore, the configuration information may be transmitted in broadcast by a system information block (for example, SIB2 or the like). That is, the system information block including the configuration information may be transmitted in broadcast. In addition, the configuration information may be individually transmitted to the UE 100 by an RRC reconfiguration message or the like.

In the present operation example, the configuration information includes information for configuring the measurement report to the UE 100. The configuration information may include NR report configuration information (for example, ReportConfigNR) that designates a criterion for triggering a measurement report event. As illustrated in FIGS. 6 and 7, the NR report configuration information (ReportConfigNR) may include measurement type information (for example, reportType) indicating a type of a measurement report to be configured. The measurement type information (reportType) may include relaxation trigger information (for example, relaxedMeasEventTriggered) used for the UE 100 to report that the relaxed measurement condition is fulfilled. The relaxation trigger information may include an event identifier (for example, eventId) indicating a trigger criterion of the report. The event identifier (eventId) may indicate the stationary event (for example, eventS1). The event identifier may indicate the stationary and non-cell edge event (for example, eventS2) described later.

The event identifier (eventId) may include a stationary threshold T1 applied to the stationarity criterion. Therefore, the controller 240 of the base station 200 can include the stationary threshold T1 in the RRC message. As a result, the communicator 120 of the UE 100 can receive the stationary threshold T1 from the serving cell. The stationary threshold T1 may include at least one of a power threshold (for example, s-SearchDeltaP-Stationary) to be compared with a value calculated based on the received power measured as the radio quality for the serving cell and a quality threshold (for example, s-SearchDeltaQ-Stationary) to be compared with a value calculated based on the received quality measured as the radio quality for the serving cell. The power threshold (s-SearchDeltaP-Stationary) may be $S_{SearchDeltaP\_stationary}$ described later. $S_{SearchDeltaP\_stationary}$ specifies a threshold of a received level value (for example, Srxlev) variation for relaxed measurement. The received level value (Srxlev) may be a received level value (for example, Cell selection RX level value) for cell selection. The quality threshold (for example, s-SearchDeltaQ-Stationary) may be $S_{SearchDeltaQ\_stationary}$ described later. $S_{SearchDeltaQ\_stationary}$ specifies a threshold of a quality value (for example, Squal) variation for relaxed measurement. The quality value (Squal) may be a quality value (for example, Cell selection quality value) for cell selection.

In addition, the event identifier (eventId) may include time period information (for example, t-SearchDeltaP-Stationary) specifying specified time period over which the variation of the received level value (Srxlev) is evaluated. The time period information (t-SearchDeltaP-Stationary) may be $T_{SearchDeltaP\_stationary}$ described later. In addition, the event identifier (eventId) may include leaving report information (for example, reportOnLeave) indicating whether or not the UE 100 should initiate a measurement report procedure when the leaving condition is fulfilled for the serving cell.

The relaxation trigger information (for example, relaxedMeasEventTriggered) may include report interval information (for example, reportInterval) indicating an interval of measurement reports applied to the relaxation trigger information. In addition, the relaxation trigger information may include report amount information (for example, reportAmount) indicating the number of measurement reports applied to the relaxation trigger information.

Note that the configuration information may include measurement configuration information (for example, MeasConfig) that designates the measurement executed by the UE 100.

The configuration information may include a measurement object list (for example, MeasObjectToAddMod) related to a list for adding or changing a measurement object. The measurement object list (MeasObjectToAddMod) may include an NR measurement object (MeasObjectNR) that designates information applicable to intra-frequency/inter-frequency measurement of an SS (synchronization signal)/PBCH (physical broadcast channel) block and/or intra-frequency/inter-frequency measurement of a channel state information-reference signal (CSI-RS).

The configuration information may include a measurement identifier list (for example, measIdList/MeasIdToAddModList) related to a list for adding or changing a measurement identifier. The measurement identifier list may include a measurement identifier (measId), a measurement object identifier (for example, measObjectId), and a report configuration identifier (for example, ReportConfigId). The measurement identifier (measId), the measurement object identifier (measObjectId), and the report configuration identifier (ReportConfigId) are associated with each entry.

The configuration information may include a report configuration list (for example, reportConfigList/ReportConfigToAddModList) related to a list of report configurations for adding or changing. The report configuration list may include a report configuration identifier (for example, reportConfigId) and report configuration information (for example, reportConfig). The report configuration information (reportConfig) may include NR report configuration information (ReportConfigNR).

The configuration information may include a low mobility threshold applied to a low mobility criterion indicating that the UE 100 is in a low mobility state. Thereby, the UE 100 can receive the low mobility threshold from the serving cell. The low mobility threshold may be $S_{SearchThresholdP}$ that specifies a threshold of Srxlev for relaxed measurement. The low mobility threshold may be $S_{SearchThresholdQ}$ that specifies a threshold of Squal for relaxed measurement. The stationary threshold T1 is different from the low mobility threshold. A minimum setting value of the stationary threshold T1 may be a value smaller than a minimum setting value of the low mobility threshold.

The controller 140 of the UE 100 configures information included in the configuration information. The UE 100 can perform the following operation based on the configured information.

Step S102:

The controller 140 of the UE 100 performs measurement and determination. Specifically, the controller 140 measures at least one of received power and received quality as the radio quality of the serving cell. The received power may be reference signal received power (RSRP). The received quality may be reference signal received quality (RSRQ). The controller 140 measures the radio quality by measuring a reference signal (RS) from the serving cell.

The controller 140 of the UE 100 determines whether or not the stationarity criterion is fulfilled based on the measurement result of the radio quality and the stationary threshold T1. The stationarity criterion is a criterion used for selecting whether or not to execute measurement according to a measurement relaxation method for relaxing measurement of radio quality for an adjacent cell, and is a criterion for determining whether or not the UE 100 is in a stationary state. The controller 140 may use any one of a first method and a second method as a method for determining whether or not the stationarity criterion is fulfilled.

In the first method, when the stationary threshold T1 includes the quality threshold, the controller 140 may determine whether or not the stationarity criterion is fulfilled based on the quality threshold, regardless of whether or not the stationary threshold T1 includes the power threshold. As illustrated in E1 of FIG. 8, in a case where the stationary threshold T1 includes the quality threshold, that is, in a case where $S_{SearchDeltaQ\_stationary}$ is set as the quality threshold for the UE 100, the controller 140 may determine whether or not the following formula is fulfilled as the stationarity criterion. The controller 140 applies the set $S_{SearchDeltaQ\_stationary}$ to the following stationarity criterion.

$$(Squal_{Ref}-Squal)<S_{SearchDeltaQ\_stationary}$$

Squal is a current Squal value of the serving cell. $Squal_{Ref}$ is a criterion Squal value of the serving cell. For the criterion Squal value, after (i) selection or reselection of a new cell, when (ii) $(Squal-Squal_{Ref})>0$ is fulfilled or when (iii) the stationarity criterion is not fulfilled for a specified time period $(T_{SearchDeltaP\_stationary})$, the controller 140 of the UE 100 may set the current Squal value of the serving cell to $Squal_{Ref}$.

Note that the Squal value is calculated by the following formula.

$$Squal=Q_{qualmeas}-(Q_{qualmin}+Q_{qualminoffset})-Qoffset_{temp}$$

$Q_{qualmeas}$ is a measured quality level (RSRQ) of the cell. $Q_{qualmin}$ is a minimum required quality level. $Q_{qualminoffset}$ is a specified offset that is constantly applied. $Qoffset_{temp}$ is an offset that is temporarily applied.

When the stationary threshold T1 does not include the quality threshold but includes the power threshold, the controller 140 may determine whether or not the stationarity criterion is fulfilled based on the power threshold. As illustrated in E2 of FIG. 8, when the stationary threshold T1 does not include the quality threshold but includes the power threshold, the controller 140 may determine whether or not the following formula is fulfilled as the stationarity criterion. The controller 140 applies the set $S_{SearchDeltaP\_stationary}$ to the following stationarity criterion.

$$(Srxlev_{Ref}-Srxlev)<S_{SearchDeltaP\_stationary}$$

Srxlev is a current Srxlev value of the serving cell. $Srxlev_{Ref}$ is a criterion Srxlev value of the serving cell. For the criterion Srxlev value, after (i) selection or reselection of a new cell, when (ii) $(Srxlev-Srxlev_{Ref})>0$ is fulfilled or when (iii) the stationarity criterion is not fulfilled for a specified time period $(T_{SearchDeltaP\_stationary})$, the controller 140 of the UE 100 may set the current Srxlev value of the serving cell to $Srxlev_{Ref}$.

Note that the Srxlev value is calculated by the following formula.

$$Srxlev=Q_{rxlevmeas}-(Q_{rxlevmin}+Q_{rxlevminoffset})-P_{compensation}-Qoffset_{temp}$$

$Q_{rxlevmeas}$ is measured received power (RSRP) of the cell. $Q_{rxlevmin}$ is minimum required received power. $Q_{rxlevminoffset}$ is a specified offset that is constantly applied. $P_{compensation}$ is a parameter related to an uplink capability. $Qoffset_{temp}$ is an offset that is temporarily applied.

In the second method, when the stationary threshold T1 includes the quality threshold and the power threshold, the controller 140 may determine whether or not the stationarity criterion is fulfilled based on the quality threshold and the power threshold. As illustrated in E3 of FIG. 9, in a case where the stationary threshold T1 includes the quality threshold and the power threshold, that is, in a case where $S_{SearchDeltaQ\_stationary}$ is set to the UE 100 as the quality threshold and $S_{SearchDeltaP\_stationary}$ is set to the UE 100 as the power threshold, the controller 140 may determine whether or not the following formula is fulfilled as the stationarity criterion. The controller 140 applies the set $S_{SearchDeltaQ\_stationary}$ and $S_{SearchDeltaP\_stationary}$ to the following stationarity criterion.

$$(Srxlev_{Ref}-Srxlev)<S_{SearchDeltaP\_stationary} \quad \text{and}$$
$$(Squal_{Ref}-Squal)<S_{SearchDeltaQ\_stationary}$$

When the stationary threshold T1 does not include the quality threshold but includes the power threshold, the controller 140 may determine whether or not the stationarity criterion is fulfilled based on the power threshold. As illustrated in E4 of FIG. 9, when the stationary threshold T1 does not include the quality threshold but includes the power threshold, the controller 140 may determine whether or not the following formula is fulfilled as the stationarity criterion. The controller 140 applies the set $S_{SearchDeltaP\_stationary}$ to the following stationarity criterion.

$$(Srxlev_{Ref}-Srxlev)<S_{SearchDeltaP\_stationary}$$

As illustrated in A1 of FIG. 10, in a case where a condition S1-1 is fulfilled, the controller 140 may consider that the condition for entering the stationary event is fulfilled. The condition S1-1 may be that (i) the UE 100 executes normal measurement of radio quality for intra-frequency cell(s), normal measurement of radio quality for NR inter-frequency cell(s), or normal measurement of radio quality for inter-RAT cell(s) for at least a specified time period $(T_{SearchDeltaP\_stationary})$ after handover to the serving cell or (re) establishment of RRC connection to the serving cell, and (ii) the stationarity criterion is fulfilled for a specified time period $(T_{SearchDeltaP\_stationary})$.

As illustrated in A2 of FIG. 10, in a case where a condition S1-2 is fulfilled, the controller 140 may consider that the leaving condition from the stationary event is fulfilled. The condition S1-2 may be that the stationarity criterion is not fulfilled for a specified time period $(T_{SearchDeltaP\_stationary})$ after the entering condition is fulfilled.

As illustrated in A3 of FIG. 10, regarding the above measurement, the controller 140 may aim at the serving cell corresponding to the NR measurement object (MeasObjectNR) associated with the stationary event.

Furthermore, as illustrated in B1 of FIG. 11, in the UE 100, regarding each measurement identifier (measId) included in a measurement identifier list (measIdList) included in variable measurement configuration information (for example, VarMeasConfig), in a case where corresponding report configuration information (reportConfig) includes measurement type information (reportType) configured in relaxation trigger information (relaxedMeasEventTriggered) and corresponding measurement object information (measObject) is related to NR, the UE 100 may be considered as applying only to the serving cell.

As illustrated in B2 of FIG. 11, in a case where a variable measurement report list (for example, VarMeasReportList) does not include a measurement report entry related to the measurement identifier, the measurement type information (reportType) is configured in the relaxation trigger information (relaxedMeasEventTriggered), and the condition for entering the event indicated by the event identifier is fulfilled, the controller 140 of the UE 100 may perform the following operation. Note that the variable measurement report list (VarMeasReportList) for each measurement identifier may include a measurement identifier (measId), a cell trigger list (for example, cellsTriggeredList), and report number information (for example, numberOfReportsSent).

The controller 140 may include a measurement report entry in the variable measurement report list (VarMeasReportList) related to the measurement identifier. The controller 140 may set the report number information (numberOfReportsSent) defined in the variable measurement report list (VarMeasReportList) related to the measurement identifier to 0. The controller 140 may include information of the serving cell in the cell trigger list (cellsTriggeredList) defined in the variable measurement report list (VarMeas- ReportList) related to the measurement identifier. In addition, the controller 140 may initiate a measurement report procedure.

In the following description, it is assumed that the controller 140 determines that the stationarity criterion is fulfilled, specifically, the condition for entering the stationary event is fulfilled.

Step S103:

The communicator 120 of the UE 100 transmits the measurement report message to the serving cell (the base station 200 and the network). The radio communicator 220 of the base station 200 receives the measurement report message.

The communicator 120 can transmit the measurement report message to the serving cell (network) in response to the stationarity criterion being fulfilled. The measurement report message may indicate that the stationarity criterion is fulfilled.

The measurement report message is a radio resource control (RRC) message. The measurement report message may be a message for transferring the measurement result of the radio quality to the network. The measurement report message includes measurement result information (for example, MeasResults). The measurement result information (MeasResults) may include a measurement identifier associated with an identifier (event identifier) of the stationary event and a measurement result of radio quality of the serving cell. The controller 140 may include the measurement identifier associated with the identifier (event identifier) of the stationary event in the measurement report message when the condition for entering the stationary event indicating that the stationarity criterion is fulfilled is fulfilled.

The controller 240 of the base station 200 may select whether or not to cause the UE 100 to execute measurement (hereinafter, relaxed measurement) according to a measurement relaxation method for relaxing measurement of radio quality for an adjacent cell, based on the measurement report message. As such, the controller 240 determines whether or not to execute the relaxed measurement and controls the relaxed measurement.

In a case of selecting to cause the UE 100 to execute the relaxed measurement, the controller 240 can execute the processing of step S104. When the measurement report message includes the measurement identifier associated with the identifier (event identifier) of the stationary event, and the UE 100 does not execute the relaxed measurement (for example, when the UE 100 is not caused to execute the relaxed measurement), the controller 240 can determine that the condition for entering the stationary event is fulfilled. Further, the controller 240 may determine whether or not the stationarity criterion is fulfilled based on the measurement result included in the measurement report message. For example, the controller 240 can determine whether or not the stationarity criterion is fulfilled from the stationary threshold transmitted to the UE 100 and the measurement result.

When the condition for entering the stationary event is fulfilled, the controller 240 may determine that the relaxed measurement condition for causing the UE 100 to execute the relaxed measurement is fulfilled and select to cause the UE 100 to execute the relaxed measurement. When the controller 240 selects to cause the UE 100 to execute the relaxed measurement, the following processing can be executed.

Step S104:

The radio communicator 220 of the base station 200 transmits, to the UE 100, a relaxed measurement instruction for causing the UE 100 to execute relaxed measurement. The communicator 120 of the UE 100 receives the relaxed measurement instruction from the serving cell.

The relaxed measurement instruction may be individually transmitted to the UE 100 by an RRC reconfiguration message or the like. The relaxed measurement instruction may include, for example, measurement configuration information (MeasConfig) for causing the UE 100 to execute the relaxed measurement. The relaxed measurement instruction may be an instruction to enable execution of the relaxed measurement. Note that the relaxed measurement instruction may include a parameter for multiplying an allowable time described later by a designated value.

Step S105:

The controller 140 of the UE 100 executes the relaxed measurement for an adjacent cell according to the relaxed measurement instruction. For example, when the relaxed measurement is executed, an allowable time for detecting the adjacent cell may be multiplied by a designated value, an allowable time for measuring the adjacent cell may be multiplied by a designated value, or an allowable time for evaluating the adjacent cell may be multiplied by a designated value.

Note that the adjacent cell is a cell different from the serving cell. The adjacent cell is at least one of intra-frequency cell(s), NR inter-frequency cell(s), and inter-RAT frequency cell(s).

Step S106:

The controller 140 of the UE 100 performs measurement and determination, similarly to step S102. The controller 140 may execute the processing of step S107 when the leaving condition from the stationary event is fulfilled. Therefore, the controller 140 may execute the processing of step S107 when the stationarity criterion is not fulfilled.

The controller 140 may execute the processing of step S107 based on the leaving report information (reportOnLeave) included in the event identifier (eventId) indicating the stationary event. The controller 140 may execute the processing of step S107 when the leaving report information (reportOnLeave) indicates that the UE 100 should initiate the measurement report procedure in a case where the leaving condition is fulfilled for the serving cell.

As illustrated in B3 of FIG. 11, in a case where the measurement type information (reportType) is configured in the relaxation trigger information (relaxedMeasEventTriggered), and the leaving condition from the event indicated by the event identifier is fulfilled for the serving cell included in the cell trigger list (cellsTriggeredList) defined in the variable measurement report list (VarMeasReportList) related to the measurement identifier, the controller 140 of the UE 100 may perform the following operation.

The controller 140 may delete information of the serving cell defined in the variable measurement report list (VarMeasReportList) related to the measurement identifier. In addition, in a case where the leaving report information (reportOnLeave) is set to "true" in the corresponding report configuration, the controller 140 may initiate the measurement report procedure. When the cell trigger list (cellsTriggeredList) defined in the variable measurement report list (VarMeasReportList) related to the measurement identifier is empty, the controller 140 may delete the measurement report entry in the variable measurement report list (VarMeasReportList) related to the measurement identifier. When a periodic report timer of the measurement identifier is running, the report timer may be stopped.

Step S107:

The communicator 120 of the UE 100 transmits the measurement report message to the serving cell (the base station 200 and the network), similarly to step S103. The radio communicator 220 of the base station 200 receives the measurement report message.

The communicator 120 can transmit the measurement report message to the serving cell (network) in response to the stationarity criterion being not fulfilled. The measurement report message may indicate that the stationarity criterion is not fulfilled.

When the leaving condition for the stationary event is fulfilled, the controller 140 may include the measurement identifier associated with the identifier (event identifier) of the stationary event in the measurement report message.

Similarly to step S103, the controller 240 of the base station 200 may select whether or not to cause the UE 100 to execute the relaxed measurement based on the measurement report message.

In a case of selecting not to cause the UE 100 to execute the relaxed measurement, the controller 240 can execute the processing of step S108. When the measurement report message includes the measurement identifier associated with the identifier (event identifier) of the stationary event and the UE 100 executes the relaxed measurement (for example, when the UE 100 is caused to execute the relaxed measurement), the controller 240 can determine that the leaving condition for the stationary event is fulfilled. Further, the controller 240 may determine whether or not the stationarity criterion is fulfilled based on the measurement result included in the measurement report message.

When the leaving condition from the stationary event is fulfilled, the controller 240 may determine that the relaxed measurement condition for causing the UE 100 to execute the relaxed measurement is not fulfilled, and may select not to cause the UE 100 to execute the relaxed measurement. In a case of selecting not to cause the UE 100 to execute the relaxed measurement, the controller 240 can execute the following processing.

Step S108:

The radio communicator 220 of the base station 200 transmits a normal measurement instruction for causing the UE 100 not to execute the relaxed measurement to the UE 100. The communicator 120 of the UE 100 receives the normal measurement instruction from the serving cell.

The normal measurement instruction may be individually transmitted to the UE 100 by an RRC reconfiguration message or the like. The normal measurement instruction may include, for example, measurement configuration information (MeasConfig) for causing the UE 100 not to execute the relaxed measurement. The relaxed measurement instruction may be an instruction to disable the execution of the relaxed measurement.

The controller 140 of the UE 100 ends the execution of the relaxed measurement for the adjacent cell according to the normal measurement instruction. The controller 140 starts normal measurement for the adjacent cell.

(2) Second Operation Example

With reference to FIGS. 12 to 15, a second operation example will be described focusing on differences from the above-described operation example. In the second operation example, a case where the UE 100 transmits a UE assistance information (UEAssistanceInformation) message to the base station 200 according to whether or not the stationarity criterion is fulfilled will be described.

Figure 12:
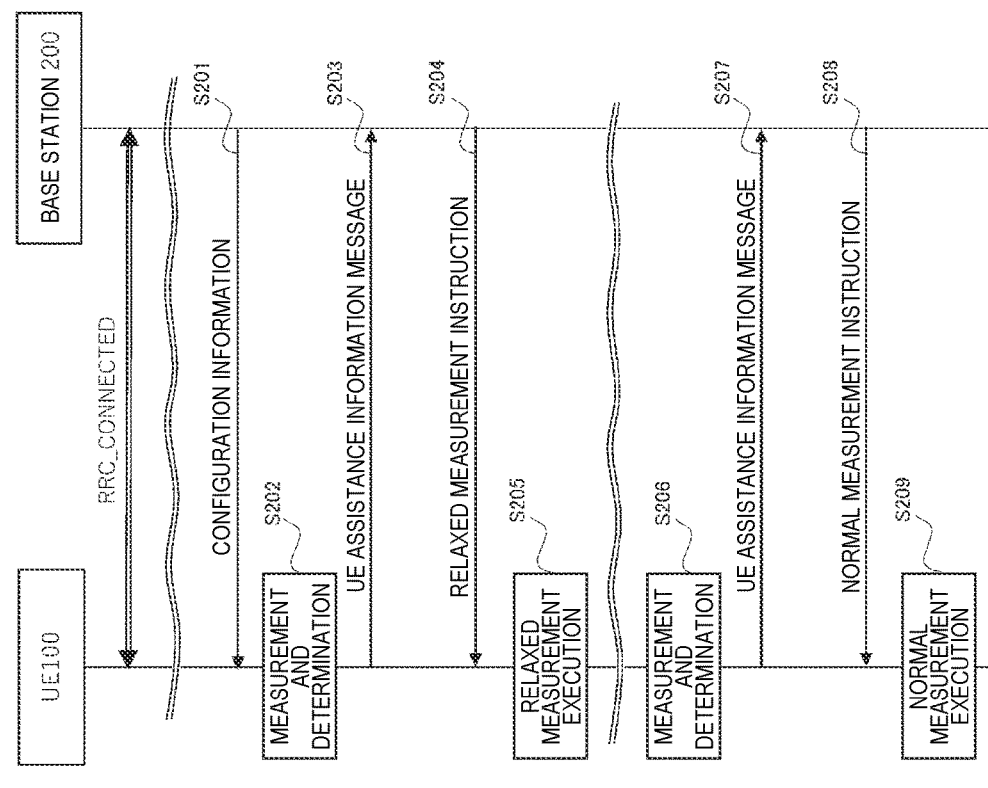
FIG. 12 is a sequence diagram illustrating a second operation example of the mobile communication system according to the embodiment.

Step S201:

As illustrated in FIG. 12, the radio communicator 220 of the base station 200 transmits the configuration information to the UE 100, similarly to step S101. The communicator 120 of the UE 100 receives the configuration information from the base station 200 (serving cell).

In the present operation example, as illustrated in FIG. 13, the configuration information may include state configuration information (for example, stationaryStatusConfig) for configuring that the UE 100 reports the assistance information in order to notify the base station 200 of the stationary state detected by the UE 100. The state configuration information may include a setting value (for example, stationaryStatusProhibitTimer) of a prohibit timer for state information reporting. The prohibit timer (for example, Txxx) starts in response to transmission of a UE assistance information message including state information to be described later. The prohibit timer (Txxx) stops in response to release of the state configuration information (stationaryStatusConfig) or reception of information for releasing the state configuration information (stationaryStatusConfig).

Further, the configuration information may include the stationary threshold T1. The state configuration information (stationaryStatusConfig) may include the stationary threshold T1.

The controller 140 of the UE 100 configures information included in the configuration information. The UE 100 can perform the following operation based on the configured information.

Step S202:

The controller 140 of the UE 100 performs measurement and determination, similarly to step S102. The controller 140 may determine that the UE 100 is in a stationary state when the stationarity criterion is fulfilled. On the other hand, the controller 140 may determine that the UE 100 is not in a stationary state when the stationarity criterion is not fulfilled.

As illustrated in FIG. 14, the controller 140 of the UE 100 having a capability of providing state information (stationary status information) indicating whether or not the UE is in a stationary state in an RRC connected state may execute the following operation in a case where the UE is configured to provide the state information and the UE enters the stationary state or leaves the stationary state. Note that the UE 100 may be configured to provide the state information based on the state configuration information.

The controller 140 may start the transmission of the UE assistance information message when the UE assistance information message has not been transmitted after the state configuration information is received. Further, when the state information indicating that the UE 100 is not in a stationary state is included in the UE assistance information message lastly transmitted to the network, the controller 140 may start to transmit the UE assistance information message in response to the stationarity criterion being fulfilled. Further, when the state information indicating that the UE 100 is in a stationary state is included in the UE assistance information message lastly transmitted to the network, the controller 140 may start to transmit the UE assistance information message in response to the stationarity criterion being not fulfilled.

In addition, the controller 140 may start the prohibit timer in response to the transmission of the UE assistance information message including the state information. When the prohibit timer is running, the communicator 120 may not transmit a next UE assistance information message including the state information.

As illustrated in FIG. 14, in a case where (i) the UE assistance information message including the state information was not transmitted after being configured to provide the state information, or in a case where (ii) the current stationary state was different from the state indicated by the UE assistance information message including the state information and transmitted lastly and the prohibit timer was not running, the controller 140 may start the prohibit timer in which a timer value is set to the setting value (stationaryStatusProhibitTimer) of the prohibit timer. In addition, the controller 140 may start transmission of the UE assistance information message in order to provide the state information.

As illustrated in FIGS. 14 and 15, when transmission of the UE assistance information message is started in order to provide the state information, the controller 140 includes the state information in the UE assistance information message. The state information indicates whether or not the UE 100 is in a stationary state. In the present operation example, the state information indicates that the UE 100 is in a stationary state.

Step S203:

The communicator 120 of the UE 100 transmits the UE assistance information message to the serving cell (the base station 200 and the network). The communicator 120 can transmit the UE assistance information message to the serving cell (network) in response to the stationarity criterion being fulfilled. The radio communicator 220 of the base station 200 receives the UE assistance information message.

The UE assistance information message is a radio resource control (RRC) message. The UE assistance information message may be a message used to indicate information of the UE 100 to the network. The UE assistance information message may indicate that the stationarity criterion is fulfilled by the state information indicating whether or not the UE 100 is in a stationary state.

The controller 240 of the base station 200 may select whether or not to cause the UE 100 to execute the relaxed measurement based on the UE assistance information message. In a case of selecting to cause the UE 100 to execute the relaxed measurement, the controller 240 can execute the processing of step S204. When the UE assistance information message includes the state information indicating that the UE 100 is in a stationary state, the controller 240 may select to cause the UE 100 to execute the relaxed measurement.

Steps S204 and S205:

These are similar to steps S104 and S105.

Step S206:

The controller 140 of the UE 100 performs measurement and determination, similarly to step S202. Here, the description will be given on the assumption that the stationarity criterion is not fulfilled and the controller 140 determines that the UE 100 is not in a stationary state.

The controller 140 may start the transmission of the UE assistance information message in a case where (ii) the prohibit timer is not running because the current stationary state is different from the state indicated by the UE assistance information message including the state information and transmitted lastly. The controller 140 includes the state information indicating that the UE 100 is not in a stationary state in the UE assistance information message.

Step S207:

The communicator 120 of the UE 100 transmits the UE assistance information message to the serving cell (the base station 200 and the network). The communicator 120 can transmit the UE assistance information message to the serving cell (network) in response to the stationarity criterion being not fulfilled. The radio communicator 220 of the base station 200 receives the UE assistance information message.

The controller 240 of the base station 200 may select whether or not to cause the UE 100 to execute the relaxed measurement based on the UE assistance information message. In a case of selecting not to cause the UE 100 to execute the relaxed measurement, the controller 240 can execute the processing of step S208. The controller 240 may select not to cause the UE 100 to execute the relaxed measurement when the UE assistance information message includes the state information indicating that the UE 100 is not in a stationary state.

Steps S208 and S209:

These are similar to steps S108 and S109.

(3) Third Operation Example

With reference to FIGS. 5 to 7 and 16, a third operation example will be described focusing on differences from the above-described operation examples. In the third operation example, the stationary and non-cell edge event (for example, eventS2) will be described. A sequence in the present operation example is similar to that in the first operation example.

The event identifier may indicate the stationary and non-cell edge event (eventS2) described later. As illustrated in FIG. 6, the event identifier (eventId) may include the stationary threshold T1 applied to the stationarity criterion and the non-cell edge threshold T2 applied to the non-cell edge criterion.

The non-cell edge threshold T2 may include at least one of a power threshold (for example, s-SearchThresholdP) to be compared with a value calculated based on the received power measured as the radio quality for the serving cell and a quality threshold (for example, s-SearchThresholdQ) to be compared with a value calculated based on the received quality measured as the radio quality for the serving cell.

The power threshold (s-SearchThresholdP) may be $S_{SearchThresholdP}$. The network may be configured such that the power threshold (s-SearchThresholdP) is a value equal to or less than $S_{IntraSearchP}$ and $S_{nonIntraSearchP}$ in SIB2. $S_{IntraSearchP}$ specifies a threshold of Srxlev for measurement of intra-frequency cell(s). $S_{nonIntraSearchP}$ specifies a threshold of Srxlev for measurement of NR inter-frequency cell(s) and measurement of inter-RAT cell(s). The quality threshold (s-SearchThresholdQ) may be $S_{SearchThresholdQ}$. The network may be configured such that the quality threshold (s-SearchThresholdQ) is a value equal to or less than $S_{IntraSearchQ}$ and $S_{nonIntraSearchQ}$ in SIB2. $S_{IntraSearchQ}$ specifies a threshold of Squal for measurement of intra-frequency cell(s). $S_{nonIntraSearchQ}$ specifies a threshold of Squal for measurement of NR inter-frequency cell(s) and measurement of inter-RAT cell(s).

Step S102:

The controller 140 of the UE 100 performs measurement and determination. The controller 140 determines whether or not the stationarity criterion is fulfilled based on the measurement result of the radio quality and the stationary threshold T1. In addition, the controller 140 determines whether or not the non-cell edge criterion is fulfilled based on the measurement result of the radio quality and the non-cell edge threshold T2. The non-cell edge criterion is a criterion used for selecting whether or not to execute measurement according to a measurement relaxation method for relaxing measurement of radio quality for an adjacent cell, and is a criterion for determining whether or not the UE 100 is in a non-cell edge state where it is not at a cell edge of the serving cell. The controller 140 may determine whether or not the following formula is fulfilled as a method for determining whether or not the non-cell edge criterion is fulfilled.

When $Srxlev > S_{SearchThresholdP}$ and $Squal > S_{SearchThresholdQ}$ $S_{SearchThresholdQ}$ are not set, $Squal > S_{SearchThresholdQ}$ does not need to be determined. That is, the controller 140 may determine whether or not $Srxlev > S_{SearchThresholdP}$ is fulfilled.

As illustrated in B1 of FIG. 16, in a case where a condition S2-1 is fulfilled, the controller 140 may consider that the condition for entering the stationary and non-cell edge event is fulfilled. The condition S2-1 may be that (i) the UE 100 executes normal measurement of radio quality for intra-frequency cell(s), normal measurement of radio quality for NR inter-frequency cell(s), or normal measurement of radio quality for inter-RAT frequency cell(s) for at least a specified time period ($T_{SearchDeltaP\_stationary}$) after handover to the serving cell or (re) establishment of RRC connection to the serving cell, (ii) the stationarity criterion is fulfilled for a specified time period ($T_{SearchDeltaP\_stationary}$), and (iii) the non-cell edge criterion is fulfilled.

As illustrated in B2 of FIG. 16, in a case where the condition S2-2 is fulfilled, the controller 140 may consider that the leaving condition from the stationary and non-cell edge event is fulfilled. The condition S2-2 may be that, after the entering condition is fulfilled, (i) for a specified time period ($T_{SearchDeltaP\_stationary}$), the stationarity criterion is not fulfilled, or (ii) the non-cell edge criterion is not fulfilled.

As illustrated in B3 of FIG. 16, regarding the above measurement, the controller 140 may aim at the serving cell corresponding to the NR measurement object (MeasObjectNR) associated with the stationary and non-cell edge event.

Step S103:

The communicator 120 can transmit the measurement report message to the serving cell (network) in response to both the stationarity criterion and the non-cell edge criterion being fulfilled.

The measurement report message includes measurement result information (MeasResults). The measurement result information (MeasResults) may include a measurement identifier associated with the identifier (event identifier) of the stationary and non-cell edge event and a measurement result of radio quality of the serving cell. The controller 140 may include the measurement identifier associated with the identifier (event identifier) of the stationary event in the measurement report message when the condition for entering the stationary and non-cell edge event is fulfilled. The measurement report message may indicate, by the measurement identifier, that both the stationarity criterion and the non-cell edge criterion are fulfilled.

The controller 240 of the base station 200 can determine that the condition for entering the stationary and non-cell edge event is fulfilled, when the measurement report message includes the measurement identifier associated with the identifier (event identifier) of the stationary and non-cell edge event and the UE 100 does not execute the relaxed measurement (for example, when the UE 100 is not caused to execute the relaxed measurement). In addition, the controller 240 may determine whether or not both the stationarity criterion and the non-cell edge criterion are fulfilled based on the measurement result included in the measurement report message. For example, the controller 240 can determine whether or not both the stationarity criterion and the non-cell edge criterion are fulfilled from the stationary threshold T1 and the non-cell edge threshold T2 transmitted to the UE 100 and the measurement result.

When the condition for entering the stationary and non-cell edge event is fulfilled, the controller 240 may determine that the relaxed measurement condition for causing the UE 100 to execute the relaxed measurement is fulfilled and select to cause the UE 100 to execute the relaxed measurement. In a case of selecting to cause the UE 100 to execute the relaxed measurement, the controller 240 can execute the processing of step S104.

Step S104:

The radio communicator 220 of the base station 200 transmits, to the UE 100, a relaxed measurement instruction for causing the UE 100 to execute relaxed measurement. The communicator 120 of the UE 100 receives the relaxed measurement instruction from the serving cell.

The relaxed measurement instruction may be, for example, an instruction to relax the measurement more than the first operation example. In the relaxed measurement instruction, for example, a magnification of a parameter for multiplying the allowable time by a designated value may be higher than that in the first operation example. The relaxed measurement instruction may be an instruction that allows non-execution of measurement for an adjacent cell.

Step S105:

The controller 140 of the UE 100 executes the relaxed measurement for an adjacent cell according to the relaxed measurement instruction.

Step S106:

The controller 140 of the UE 100 performs measurement and determination, similarly to step S102. The controller 140 may execute the processing of step S107 when the leaving condition from the stationary and non-cell edge event is fulfilled. Therefore, the controller 140 may execute the processing of step S107 when at least one of the stationarity criterion and the non-cell edge criterion is not fulfilled.

The controller 140 may execute the processing of step S107 based on the leaving report information (reportOnLeave) included in the event identifier (eventId) indicating the stationary and non-cell edge event. The controller 140 may execute the processing of step S107 when the leaving report information (reportOnLeave) indicates that the UE 100 should initiate the measurement report procedure in a case where the leaving condition is fulfilled for the serving cell.

Step S107:

The communicator 120 of the UE 100 transmits the measurement report message to the serving cell (the base station 200 and the network), similarly to step S103. The radio communicator 220 of the base station 200 receives the measurement report message.

The communicator 120 can transmit the measurement report message to the serving cell (network) in response to at least one of the stationarity criterion and the non-cell edge criterion being not fulfilled. The measurement report message may indicate that at least one of the stationarity criterion and the non-cell edge criterion is not fulfilled.

In a case where the leaving condition for the stationary and non-cell edge event is fulfilled, the controller 140 may include the measurement identifier associated with the identifier (event identifier) of the stationary and non-cell edge event in the measurement report message.

Similarly to step S103, the controller 240 of the base station 200 may select whether or not to cause the UE 100 to execute the relaxed measurement based on the measurement report message.

In a case of selecting not to cause the UE 100 to execute the relaxed measurement, the controller 240 can execute the processing of step S108. The controller 240 can determine that the leaving condition for the stationary and non-cell edge event is fulfilled, when the measurement report message includes the measurement identifier associated with the identifier (event identifier) of the stationary and non-cell edge event and the UE 100 executes the relaxed measurement (for example, when the UE 100 is caused to execute the relaxed measurement). In addition, the controller 240 may determine whether or not at least one of the stationarity criterion and the non-cell edge criterion is fulfilled based on the measurement result included in the measurement report message.

When the leaving condition from the stationary event is fulfilled, the controller 240 may determine that the relaxed measurement condition for causing the UE 100 to execute the relaxed measurement is not fulfilled, and may select not to cause the UE 100 to execute the relaxed measurement. In a case of selecting not to cause the UE 100 to execute the relaxed measurement, the controller 240 can execute the following processing.

Step S108:

This is similar to step S108 of the first operation example.

(4) Fourth Operation Example

With reference to FIGS. 12 and 17 to 19, a fourth operation example will be described focusing on differences from the above-described operation examples. In the fourth operation example, a case where the UE 100 transmits the UE assistance information message to the base station 200 according to whether both the stationarity criterion and the non-cell edge criterion are fulfilled or whether or not the stationarity criterion and the non-cell edge criterion are fulfilled will be described. A sequence in the present operation example is similar to that in the second operation example.

Step S201:

As illustrated in FIG. 12, the radio communicator 220 of the base station 200 transmits the configuration information to the UE 100, similarly to step S101. The communicator 120 of the UE 100 receives the configuration information from the base station 200 (serving cell).

In the present operation example, as illustrated in FIG. 17, the configuration information may include state configuration information (for example, stationaryAndNot-at-cell-edgeStatusConfig) for configuring that the UE 100 reports the assistance information in order to notify the base station 200 of the stationary state and the non-cell edge state detected by the UE 100. The state configuration information may include a setting value (for example, stationaryAndNot-at-cell-edgeStatusProhibitTimer) of a prohibit timer for state information reporting. The prohibit timer (for example, Tyyy) starts in response to transmission of a UE assistance information message including state information to be described later. The prohibit timer (Tyyy) stops in response to release of the state configuration information (stationary-AndNot-at-cell-edgeStatusConfig) or reception of information for releasing the state configuration information (stationaryAndNot-at-cell-edgeStatusConfig).

Further, the configuration information may include the stationary threshold T1 and the non-cell edge threshold T2.

The state configuration information (stationaryAndNot-at-cell-edgeStatusConfig) may include the stationary threshold T1 and the non-cell edge threshold T2.

The controller 140 of the UE 100 configures information included in the configuration information. The UE 100 can perform the following operation based on the configured information.

Step S202:

The controller 140 of the UE 100 performs measurement and determination, similarly to step S102. The controller 140 may determine that the UE 100 is in a stationary state when the stationarity criterion is fulfilled. On the other hand, the controller 140 may determine that the UE 100 is not in a stationary state when the stationarity criterion is not fulfilled. In addition, the controller 140 may determine that the UE 100 is in the non-cell edge state when the non-cell edge criterion is fulfilled. On the other hand, the controller 140 may determine that the UE 100 is not in a non-cell edge state when the non-cell edge criterion is not fulfilled.

As illustrated in FIG. 18, the controller 140 of the UE 100 having a capability of providing state information (stationary and not-at-cell-edge status information) indicating whether or not the UE is in a stationary state in an RRC connected state and whether or not the UE is in a non-cell edge state may execute the following operation in a case where the UE is configured to provide the state information and the UE enters the stationary state or leaves the stationary state. Note that the UE 100 may be configured to provide the state information based on the state configuration information.

The controller 140 may start the transmission of the UE assistance information message when the UE assistance information message has not been transmitted after the state configuration information is received. In addition, when the UE assistance information message lastly transmitted to the network includes state information indicating that the UE 100 is not in a stationary state or not in a non-cell edge state, the controller 140 may start to transmit the UE assistance information message in response to both the stationarity criterion and the non-cell edge criterion being fulfilled. In addition, when the state information indicating that the UE 100 is in a stationary state and a non-cell edge state is included in the UE assistance information message lastly transmitted to the network, the controller 140 may start to transmit the UE assistance information message in response to at least one of the stationarity criterion and the non-cell edge criterion being not fulfilled.

In addition, the controller 140 may start the prohibit timer in response to the transmission of the UE assistance information message including the state information. When the prohibit timer is running, the communicator 120 may not transmit a next UE assistance information message including the state information.

As illustrated in FIG. 18, in a case where (i) the UE assistance information message including the state information was not transmitted after being configured to provide the state information, or in a case where (ii) the current stationary state or non-cell edge state was different from the state indicated by the UE assistance information message including the state information and transmitted lastly and the prohibit timer was not running, the controller 140 may start the prohibit timer in which a timer value is set to the setting value (StationaryAndNot-at-cell-edgeStatusProhibitTimer) of the prohibit timer. In addition, the controller 140 may start transmission of the UE assistance information message in order to provide the state information.

As illustrated in FIGS. 18 and 19, when transmission of the UE assistance information message is started in order to provide the state information, the controller 140 includes the state information in the UE assistance information message. The state information indicates that the UE 100 is in a stationary state and a non-cell edge state, or that the UE 100 is not in a stationary state or not in a non-cell edge state. In addition, the state information may indicate that the UE 100 is not in a state of being in a stationary state and a non-cell edge state, or may indicate that the UE 100 is in at least one of a state of not being in a stationary state and a state of not being in a non-cell edge state.

Step S203:

The communicator 120 of the UE 100 transmits the UE assistance information message to the serving cell (the base station 200 and the network). The communicator 120 can transmit the UE assistance information message to the serving cell (network) in response to both the stationarity criterion and the non-cell edge criterion being fulfilled. The radio communicator 220 of the base station 200 receives the UE assistance information message.

The UE assistance information message may indicate that both the stationarity criterion and the non-cell edge criterion are fulfilled by the state information.

The controller 240 of the base station 200 may select whether or not to cause the UE 100 to execute the relaxed measurement based on the UE assistance information message. In a case of selecting to cause the UE 100 to execute the relaxed measurement, the controller 240 can execute the processing of step S204. The controller 240 may select to cause the UE 100 to execute the relaxed measurement when the UE assistance information message includes state information indicating that the UE 100 is in a stationary state and a non-cell edge state.

Steps S204 and S205:

These are similar to steps S104 and S105.

Step S206:

The controller 140 of the UE 100 performs measurement and determination, similarly to step S202. Here, the description will be given on the assumption that the controller 140 determines that at least one of the stationarity criterion and the non-cell edge criterion is not fulfilled.

The controller 140 may start the transmission of the UE assistance information message in a case where (ii) the prohibit timer is not running because the current stationary state or non-cell edge state is different from the state indicated by the UE assistance information message including the state information and transmitted lastly. The controller 140 may include, in the UE assistance information message, state information indicating that the UE 100 is not in a stationary state or not in a non-cell edge state.

Step S207:

The communicator 120 of the UE 100 transmits the UE assistance information message to the serving cell (the base station 200 and the network). The communicator 120 can transmit the UE assistance information message to the serving cell (network) in response to at least one of the stationarity criterion and the non-cell edge criterion being not fulfilled. The radio communicator 220 of the base station 200 receives the UE assistance information message.

The controller 240 of the base station 200 may select whether or not to cause the UE 100 to execute the relaxed measurement based on the UE assistance information message. In a case of selecting not to cause the UE 100 to execute the relaxed measurement, the controller 240 can execute the processing of step S208. The controller 240 may select not to cause the UE 100 to execute the relaxed measurement when the UE assistance information message includes state information indicating that the UE 100 is not in a stationary state or not in a non-cell edge state.

Steps S208 and S209:

These are similar to steps S108 and S109.

(5) Fifth Operation Example

Figure 20:
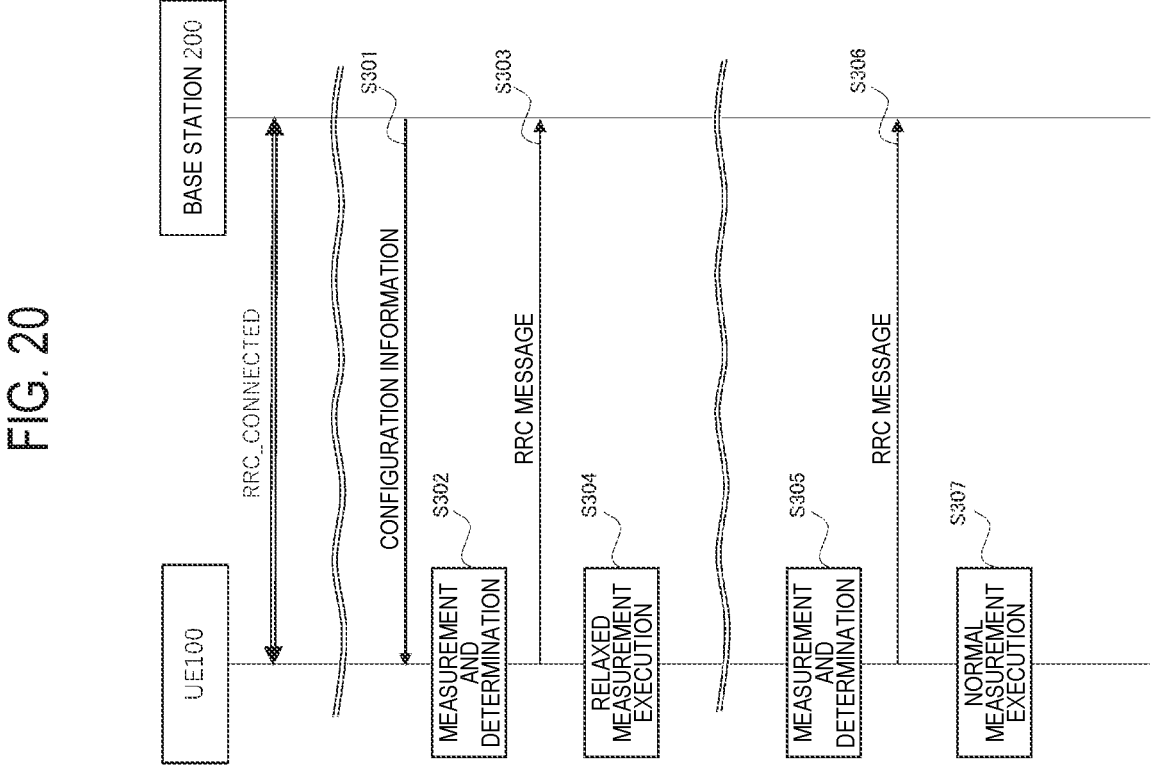
FIG. 20 is a sequence diagram illustrating a fifth operation example of the mobile communication system according to the embodiment.

With reference to FIGS. 20 to 22, a fifth operation example will be described focusing on differences from the above-described operation examples. In the fifth operation example, the UE 100 selects to execute the measurement for the adjacent cell according to the measurement relaxation method, according to whether or not the stationarity criterion is fulfilled.

Steps S301 and S302:

These are similar to steps S101 and S102 or steps S201 and S202.

The controller 140 may determine whether or not to select to execute the relaxed measurement by the following method.

As illustrated in FIG. 21, in a case where the configuration information (for example, lowMobilityEvaluation) for selecting execution of the relaxed measurement based on the low mobility criterion is configured in the UE 100 and the configuration information (for example, cellEdgeEvaluation) for selecting execution of the relaxed measurement based on the non-cell edge criterion is not configured in the UE 100, and the power threshold ($S_{SearchDeltaP\_stationary}$) included in the stationary threshold T1 and the time period information ($T_{SearchDeltaP\_stationary}$) are configured in the UE 100, the controller 140 may select to execute the measurement of the radio quality for the intra-frequency cell(s) according to the measurement relaxation method when the following conditions are fulfilled.

The above condition may be that (i) normal measurement of radio quality for intra-frequency cell(s), normal measurement of radio quality for NR inter-frequency cell(s), or normal measurement of radio quality for inter-RAT cell(s) is executed for at least a specified time period ($T_{SearchDeltaP\_stationary}$), and (ii) the stationarity criterion is fulfilled for a specified time period ($T_{SearchDeltaP\_stationary}$).

In a case where "Srxlev>$S_{nonIntraSearchP}$" and "Squal>$S_{nonIntraSearchQ}$" are fulfilled with respect to the radio quality of the serving cell, the controller 140 may select not to execute the measurement of the radio quality for the inter-frequency cell(s) or the inter-RAT cell(s) in which one hour does not elapse from the measurement of the radio quality. When the relaxed measurement at the high priority frequency is permitted, that is, when highPriorityMeasRelax is set to "true", the controller 140 may select not to execute the measurement of the radio quality for the inter-frequency cell(s) or the inter-RAT cell(s).

In a case where "Srxlev>$S_{nonIntraSearchP}$" and "Squal>$S_{nonIntraSearchQ}$" are not fulfilled with respect to the radio quality of the serving cell, the controller 140 may select to execute the measurement of the radio quality for the inter-frequency cell(s) or the inter-RAT cell(s) according to the relaxed measurement that is the same as or different from the relaxed measurement.

As illustrated in FIG. 22, in a case where both the configuration information (lowMobilityEvaluation) for selecting execution of the relaxed measurement based on the low mobility criterion and the configuration information (cellEdgeEvaluation) for selecting the execution of the relaxed measurement based on the non-cell edge criterion are configured in the UE 100, and the power threshold ($S_{SearchDeltaP\_stationary}$) included in the stationary threshold T1 and the time period information ($T_{SearchDeltaP\_stationary}$) are configured in the UE 100, the controller 140 may select not to execute the measurement of the radio quality for the intra-frequency cell(s), the inter-frequency cell(s), or the inter-RAT cell(s) in which one hour does not elapse from the measurement of the radio quality.

The above condition may be that (i) normal measurement of radio quality for intra-frequency cell(s), normal measurement of radio quality for NR inter-frequency cell(s), or normal measurement of radio quality for inter-RAT cell(s) is executed for at least a specified time period ($T_{SearchDeltaP\_stationary}$), (ii) the stationarity criterion is fulfilled for a specified time period ($T_{SearchDeltaP\_stationary}$), and (iii) the non-cell edge criterion is fulfilled.

The controller 140 may select to (i) execute normal measurement of radio quality for intra-frequency cell(s), normal measurement of radio quality for NR inter-frequency cell(s), or normal measurement of radio quality for inter-RAT cell(s) for at least a specified time period ($T_{SearchDeltaP\_stationary}$), and execute measurement of radio quality for a low-priority intra-frequency cell(s), a low-priority inter-frequency cell(s), or a low-priority inter-RAT cell(s) according to a relaxed measurement that is the same as or different from the relaxed measurement when (ii) the non-cell edge criterion is fulfilled and (iii) the relaxed measurement at the high priority frequency is not permitted.

In a case where "Srxlev≤$S_{nonIntraSearchP}$" or "Squal≤ $S_{nonIntraSearchQ}$" is fulfilled with respect to the radio quality of the serving cell, the controller 140 may select to execute the measurement of the radio quality for a high-priority inter-frequency cell(s) or a high-priority inter-RAT cell(s) according to a relaxed measurement that is the same as or different from the relaxed measurement.

Steps S303 and S306:

These are similar to step S103 or S203 and step S106 or S206. For example, when an instruction from the base station 200 is received after the selection, the UE 100 may execute the selected operation according to the instruction from the base station 200.

Steps S304, S305, and S307:

These are similar to step S104 or S204, step S106 or S206, and step S104 or S204.

Other Embodiments

In the above-described embodiment, the UE 100 may be the specific UE 100B. Since the specific UE 100B is assumed to be stationary as compared with the general UE 100A, it is easy to fulfill the stationarity criterion.

In the above-described embodiment, the UE 100 may execute the above-described operation only in the RRC connected state. In addition, for example, the UE 100 may execute any of the operations of the first to fifth operation examples in the RRC connected state, and may execute the operations of the first to fifth operation examples in the RRC idle state or the RRC inactive state.

In the above-described embodiment, the base station 200 may select to cause the UE 100 to execute the relaxed measurement or not to execute the measurement for the designated adjacent cell (non-execution of the measurement) according to the condition described in the fifth operation example. The base station 200 may transmit an instruction based on the selection result to the UE 100. The UE 100 may select to execute the relaxed measurement or not to execute the measurement based on the instruction from the base station 200.

In the above-described embodiment, the UE 100 may use another message (for example, a new RRC message) instead of the measurement report message and the UE assistance information message.

In the above-described embodiment, the base station 200 may include a plurality of units. The plurality of units may include a first unit that hosts a higher layer included in the protocol stack and a second unit that hosts a lower layer included in the protocol stack. The higher layer may include the RRC layer, the SDAP layer, and the PDCP layer, and the lower layer may include the RLC layer, the MAC layer, and the PHY layer. The first unit may be a central unit (CU), and the second unit may be a distributed unit (DU). The plurality of units may include a third unit that performs processing of a lower layer of the PHY layer. The second unit may perform processing of a higher layer of the PHY layer. The third unit may be a radio unit (RU). The base station 200 may be one of the plurality of units, and may be connected to another unit of the plurality of units. In addition, the base station 200 may be an integrated access and backhaul (IAB) donor or an IAB node.

In the above-described embodiment, a mobile communication system based on the NR is described as an example of the mobile communication system 1. However, the mobile communication system 1 is not limited to this example. The mobile communication system 1 may be a system conforming to a TS of any of LTE or another generation system (for example, sixth generation) of the 3GPP standard. The base station 200 may be an eNB providing protocol terminations of E-UTRA user plane and control plane toward the UE 100 in LTE. The mobile communication system 1 may be a system conforming to a TS defined in a standard other than the 3GPP standard.

The steps in the operation of the above-described embodiment may not necessarily be execute in chronological order according to the order described in the flow diagram or sequence diagram. For example, the steps in the operation may be performed in order different from the order described as the flow diagram or sequence diagram, or may be performed in parallel. In addition, some of the steps in the operation may be removed and additional steps may be added to the processing. Furthermore, each operation flow described above is not necessarily implemented separately and independently and a combination of two or more operation flows can be implemented. For example, some steps of one operation flow may be added to another operation flow, or some steps of one operation flow may be replaced with some steps of another operation flow.

A program for causing a computer to execute each processing performed by the UE 100 or the base station 200 may be provided. The program may be recorded on a computer readable medium. The program can be installed in the computer by using the computer readable medium. Here, the computer readable medium on which the program is recorded may be a non-transitory recording medium. The non-transitory recording medium is not particularly limited, but may be, for example, a recording medium such as a compact disk read only memory (CD-ROM) or a digital versatile disc read only memory (DVD-ROM). Furthermore, a circuit that executes each processing to be performed by the UE 100 or the base station 200 may be integrated, and at least a part of the UE 100 or the base station 200 may be configured as a semiconductor integrated circuit (chipset, SoC (system-on-chip)).

In the above-described embodiment, "transmit" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive" may mean to perform processing of at least one layer in a protocol stack used for reception, or may mean to physically receive a signal wirelessly or by wire. Alternatively, "receive" may mean a combination of performing the processing of at least one layer and physically receiving a signal wirelessly or by wire.

Although the present disclosure has been described according to examples, it is understood that the present disclosure is not limited to the examples and structures. The present disclosure also includes various modifications and modifications within an equivalent range. In addition, various combinations and modes, and other combinations and modes including only one element, more elements, or less elements are also within the scope and idea of the present disclosure.

(Supplementary Note)

Features related to the above-described embodiment are additionally described.

(Supplementary Note 1)

A communication apparatus comprising:

a communicator configured to transmit a user equipment (UE) assistance information message including information indicating whether or not a stationarity criterion regarding measurement relaxation in a radio resource control (RRC) connected state is fulfilled to a base station.

(Supplementary Note 2)

The communication apparatus according to supplementary note 1, wherein the communicator is configured to:

receive, from the base station, configuration information for configuring transmission of the UE assistance information message including the information; and transmit the UE assistance information message including the information to the base station, based on the configuration information.

(Supplementary Note 3)

The communication apparatus according to supplementary note 1 or 2, wherein when the stationarity criterion is fulfilled, the communicator is configured to transmit the UE assistance information message including the information indicating that the stationarity criterion is fulfilled to the base station.

(Supplementary Note 4)

The communication apparatus according to supplementary note 3, wherein when the information included in the UE assistance information message transmitted lastly indicates that the stationarity criterion is not fulfilled, the communicator is configured to transmit the UE assistance information message including the information to the base station.

(Supplementary Note 5)

The communication apparatus according to any one of supplementary notes 1 to 4, wherein when the stationarity criterion is not fulfilled, the communicator is configured to transmit the UE assistance information message including the information indicating that the stationarity criterion is not fulfilled to the base station.

(Supplementary Note 6)

The communication apparatus according to supplementary note 5, wherein when the information included in the UE assistance information message transmitted lastly indicates that the stationarity criterion is fulfilled, the communicator is configured to transmit the UE assistance information message including the information to the base station.

(Supplementary Note 7)

The communication apparatus according to any one of supplementary notes 1 to 6, wherein the communication apparatus has a capability of transmitting the information.

(Supplementary Note 8)

A base station comprising:

a communicator configured to receive, from a communication apparatus, a user equipment (UE) assistance information message including information indicating whether or not a stationarity criterion regarding measurement relaxation in a radio resource control (RRC) connected state is fulfilled.

(Supplementary Note 9)

A communication method executed by a communication apparatus, the method comprising the step of:

transmitting a user equipment (UE) assistance information message including information indicating whether or not a stationarity criterion regarding measurement relaxation in a radio resource control (RRC) connected state is fulfilled to a base station.

The invention claimed is:

1. A communication apparatus comprising:

a receiver configured to receive by using a radio resource control (RRC) message, from a base station, configuration information including information for configuring a transmission of a UE assistance information message, the information specifying a time period used for determining whether or not a stationarity criterion for relaxed measurement is fulfilled; and a transmitter configured to transmit, to the base station, the UE assistance information message based on the configuration information, wherein the transmitter is configured to:

transmit, to the base station, the UE assistance information message including information indicating that the stationarity criterion is fulfilled in a case where the stationarity criterion is fulfilled for the time period, and transmit, to the base station, the UE assistance information message including information indicating that the stationarity criterion is not fulfilled in a case where the stationarity criterion is not fulfilled for the time period.

2. The communication apparatus according to claim 1, wherein the transmitter is configured to transmit, to the base station, the UE assistance information message including the information indicating that the stationarity criterion is fulfilled, in a case where the information included in the UE assistance information message lastly transmitted indicates that the stationarity criterion is not fulfilled.

3. The communication apparatus according to claim 1, wherein the transmitter is configured to transmit, to the base station, the UE assistance information message including the information indicating that the stationarity criterion is not fulfilled, in a case where the information included in the UE assistance information message lastly transmitted indicates that the stationarity criterion is fulfilled.

4. The communication apparatus according to claim 1, wherein the communication apparatus has a capability of transmitting the information indicating that the stationarity criterion is fulfilled and the information indicating that the stationarity criterion is not fulfilled.

5. Abase station comprising:

a transmitter configured to transmit by using a radio resource control (RRC) message, to a communication apparatus, configuration information including information for configuring a transmission of a UE assistance information message, the information specifying a time period used for determining whether or not a stationarity criterion for relaxed measurement is fulfilled; and a receiver configured to receive, from the communication apparatus, the UE assistance information message based on the configuration information, wherein the receiver is configured to:

receive, from the communication apparatus, the UE assistance information message including information indicating that the stationarity criterion is fulfilled in a case where the stationarity criterion is fulfilled for the time period, and receive, from the communication apparatus, the UE assistance information message including information indicating that the stationarity criterion is not fulfilled in a case where the stationarity criterion is not fulfilled for the time period.

6. The base station according to claim 5, wherein the receiver is configured to receive, from the communication apparatus, the UE assistance information message including the information indicating that the stationarity criterion is fulfilled, in a case where the information included in the UE assistance information message lastly received indicates that the stationarity criterion is not fulfilled.

7. The base station according to claim 5, wherein the receiver is configured to receive, from the communication apparatus, the UE assistance information message including the information indicating that the stationarity criterion is not fulfilled, in a case where the information included in the UE assistance information message lastly received indicates that the stationarity criterion is fulfilled.

8. A communication method executed by a communication apparatus, the method comprising the steps of:

receiving by a radio resource control (RRC) message, from a base station, configuration information including information for configuring a transmission of a UE assistance information message, the information specifying a time period used for determining whether or not a stationarity criterion regarding relaxed measurement is fulfilled; and transmitting, to the base station, the UE assistance information message based on the configuration information, wherein in the step of transmitting, the UE assistance information message including information indicating that the stationarity criterion is fulfilled is transmitted to the base station, in a case where the stationarity criterion is fulfilled for the time period, and the UE assistance information message including information indicating that the stationarity criterion is not fulfilled is transmitted to the base station, in a case where the stationarity criterion is not fulfilled for the time period.

9. The communication method according to claim 8, wherein in the step of transmitting, the UE assistance information message including the information indicating that the stationarity criterion is fulfilled is transmitted to the base station, in a case where the information included in the UE assistance information message lastly transmitted indicates that the stationarity criterion is not fulfilled.

10. The communication method according to claim 8, wherein in the step of transmitting, the UE assistance information message including the information indicating that the stationarity criterion is not fulfilled is transmitted to the base station, in a case where the information included in the UE assistance information message lastly transmitted indicates that the stationarity criterion is fulfilled.

11. The communication method according to claim 8, wherein the communication apparatus has a capability of transmitting the information indicating that the stationarity criterion is fulfilled and the information indicating that the stationarity criterion is not fulfilled.

* * * * *